(12) United States Patent
Rhoads

(10) Patent No.: US 9,049,563 B2
(45) Date of Patent: *Jun. 2, 2015

(54) MOBILE DEVICE POSITIONING IN DYNAMIC GROUPINGS OF COMMUNICATION DEVICES

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,374

(22) Filed: Jun. 11, 2013

(65) Prior Publication Data

US 2014/0031059 A1    Jan. 30, 2014

Related U.S. Application Data

(63) Continuation of application No. 13/179,807, filed on Jul. 11, 2011, now Pat. No. 8,463,290.

(60) Provisional application No. 61/362,958, filed on Jul. 9, 2010.

(51) Int. Cl.
*H04W 24/00* (2009.01)
*H04W 4/04* (2009.01)
(Continued)

(52) U.S. Cl.
CPC . *H04W 4/04* (2013.01); *G08G 1/08* (2013.01); *G01S 5/0289* (2013.01)

(58) Field of Classification Search
CPC ....... H04W 88/06; H04W 84/10; H04W 8/26; H04W 56/001; H04W 56/009; H04W 64/00; H04W 92/12; H04W 12/06; H04W 4/02; H04W 72/042; H04W 88/04

USPC .............................................. 455/456.1–457
See application file for complete search history.

(56) References Cited

U.S. PATENT DOCUMENTS

| 4,405,986 A | 9/1983 | Gray |
| 5,045,861 A | 9/1991 | Duffett-Smith |

(Continued)

OTHER PUBLICATIONS

Enge, P. et al., "Special Issue on Global Positioning System," Proceedings of the IEEE, vol. 87(1), p. 3-15, Jan. 1999.

(Continued)

*Primary Examiner* — Suhail Khan
(74) *Attorney, Agent, or Firm* — Digimarc Corporation

(57) ABSTRACT

A location aware intelligent transportation system determines ranges between a plurality of communication devices, including at least one mobile communication device. A method includes receiving receive messages transmitted from a plurality of other communication devices. Each receive message includes a transmit count stamp corresponding to a remote counter value. The mobile communication device generates a receive count stamp for each receive message. The method includes dynamically associating and disassociating the mobile communication device with a plurality of sub-groups of the plurality of other communication devices. The associating and disassociating are based at least in part on receiving receive messages from a predetermined number of other communication devices for each sub-group. For each sub-group currently associated with the mobile communication device, the method includes generating range estimates between the mobile communication device and the other communication devices in the particular sub-group. The range estimates are based on a combination of the transmit count stamps and the receive count stamps.

20 Claims, 30 Drawing Sheets sends out message 'M' when A's counter is roughly in the count state: $n_A$ = 43289283653 e.g.

□ Fixed Node
○ Mobile Node

(51) Int. Cl.
*G08G 1/08* (2006.01)
*G01S 5/02* (2010.01)

(56) References Cited

U.S. PATENT DOCUMENTS

| | | | |
|---|---|---|---|
| 5,539,398 | A | 7/1996 | Hall et al. |
| 5,838,279 | A | 11/1998 | Duffett-Smith et al. |
| 6,084,547 | A | 7/2000 | Sanderford et al. |
| 6,094,168 | A | 7/2000 | Duffett-Smith et al. |
| 6,275,705 | B1 | 8/2001 | Drane et al. |
| 6,529,165 | B1 | 3/2003 | Duffett-Smith et al. |
| 6,650,877 | B1 | 11/2003 | Tarbouriech et al. |
| 6,806,830 | B2 | 10/2004 | Panasik et al. |
| 6,894,644 | B2 | 5/2005 | Duffett-Smith et al. |
| 7,224,984 | B2 | 5/2007 | Agrawala et al. |
| 7,260,407 | B2 | 8/2007 | Duffett-Smith et al. |
| 7,315,745 | B2 | 1/2008 | Duffett-Smith et al. |
| 7,359,719 | B1 | 4/2008 | Duffett-Smith et al. |
| 7,382,804 | B2 | 6/2008 | Alapuranen et al. |
| 7,397,390 | B2 | 7/2008 | Dipiazza |
| 7,508,883 | B2 | 3/2009 | Duffett-Smith et al. |
| 7,593,736 | B1 | 9/2009 | Duffett-Smith et al. |
| 7,826,837 | B1 | 11/2010 | Sylvester |
| 7,876,266 | B2 | 1/2011 | Rhoads |
| 7,983,185 | B2 | 7/2011 | Rhoads et al. |
| 8,451,763 | B2 | 5/2013 | Brundage et al. |
| 2001/0004601 | A1 | 6/2001 | Drane et al. |
| 2003/0001776 | A1 | 1/2003 | Hannah et al. |
| 2003/0014181 | A1 | 1/2003 | Myr |
| 2003/0054838 | A1 | 3/2003 | Carrez |
| 2003/0220117 | A1 | 11/2003 | Duffett-Smith et al. |
| 2004/0046693 | A1 | 3/2004 | Ogino et al. |
| 2005/0137786 | A1 | 6/2005 | Breed et al. |
| 2007/0001903 | A1 | 1/2007 | Smith et al. |
| 2007/0066231 | A1 | 3/2007 | Duffett-Smith et al. |
| 2007/0200759 | A1 | 8/2007 | Heidari-Bateni et al. |
| 2007/0247368 | A1 | 10/2007 | Wu |
| 2009/0051568 | A1 | 2/2009 | Corry et al. |
| 2009/0061899 | A1 | 3/2009 | Hwang et al. |
| 2009/0073030 | A1 | 3/2009 | Hansen et al. |
| 2009/0111482 | A1 | 4/2009 | Rowe et al. |
| 2009/0213828 | A1 | 8/2009 | Brundage et al. |
| 2009/0228732 | A1 | 9/2009 | Budde et al. |
| 2009/0233621 | A1 | 9/2009 | Rhoads et al. |
| 2009/0273518 | A1 | 11/2009 | Duffet-Smith et al. |
| 2009/0281729 | A1 | 11/2009 | Duffett-Smith et al. |
| 2009/0313370 | A1 | 12/2009 | Rhoads |
| 2010/0045531 | A1 | 2/2010 | Rhoads |
| 2010/0135178 | A1 | 6/2010 | Aggarwal et al. |
| 2010/0202300 | A1 | 8/2010 | Rhoads et al. |
| 2013/0316728 | A1 | 11/2013 | Bradley |

OTHER PUBLICATIONS

Braasch, M.S. et al., "GPS Receiver Architectures and Measurement," Proceedings of the IEEE, vol. 87(1), p. 48-64, Jan. 1999.

Misra, P. et al., "GPS Performance in Navigation," Proceedings of the IEEE, vol. 87(1), p. 65-85, Jan. 1999.

GPS Joint Program Office, "Navstar GPS Space Segment/Navigation User Interfaces," Navstar Global Positioning System, Interface Specification, IS-GPS-200, Revision D., ARINC Engineering Services, LLC, Dec. 7, 2004.

US. Joint Planning and Development Office (JPDO), Air Navigation Services Working Group, "FAA's Surveillance/Positioning Backup Strategy Alternatives Analysis." Paper No. 08-003, Jul. 15, 2008.

US. Federal Aviation Administration, "Fact Sheet—NextGen." Feb. 14, 2007, available at <<http://www.faa.gov/news/fact.sub.--sheets/news.sub.--story.cfm?ne-wsID=8145>>.

Notice of Allowance dated Jul. 25, 2012, and Notice of Allowance dated Dec. 17, 2012, in U.S. Appl. No. 12/426,787.

Appeal Brief dated May 3, 2012, in U.S. Appl. No. 12/373,944.

Examiner's Answer dated Jul. 24, 2012, in U.S. Appl. No. 12/373,944.

Notice of Allowance dated Jun. 13, 2012, in U.S. Appl. No. 12/429,030.

International Search Report and Written Opinion dated Oct. 1, 2012, in PCT/US2012/046265.

H. Feng et al., Positioning models and systems based on digital television broadcasting signals, Frontiers of Electrical and Electronic Engineering in China, vol. 2(4), p. 410-414, 2007.

Ciurana et al, "A Ranging Method With IEEE 802.11 Data Frames for Indoor Localization", WCNC 2007 proceedings.

Bahillo et al., "Indoor Location Based on IEEE 802.11 Round-Trip Time Measurements with Two-Step NLOS Mitigation", Progress In Electromagnetics Research B, vol. 15, 285-306, 2009.

U.S. Appl. No. 61/116,996, filed Nov. 21, 2008.

Office Action dated Nov. 28, 2014, in U.S. Appl. No. 13/833,679.

WHO DEFINES ZULUTIME?

□ Fixed Node
○ → Mobile Node

US 9,049,563 B2

MOBILE DEVICE POSITIONING IN DYNAMIC GROUPINGS OF COMMUNICATION DEVICES

RELATED APPLICATION

This application is a continuation of U.S. application Ser. No. 13/179,807, filed Jul. 11, 2011 (now U.S. Pat. No. 8,463, 290), which claims the benefit under 35 U.S.C. §119(e) of U.S. Provisional Application No. 61/362,958, filed Jul. 9, 2010. The above patent documents are hereby incorporated by reference herein in their entirety.

TECHNICAL FIELD

This disclosure is related to object positioning systems. In particular, this disclosure is related to mobile device positioning.

BACKGROUND INFORMATION

The $20^{th}$ century's dependence on the motorized vehicle has become the $21^{st}$ century's transportation engineering challenge framed by broadly defined cost mitigation. Generally, it is felt that things can be done in a much better way in jammed urban cores and on suburban roads and highways, but daunting mass-scale adoption issues along with old fashioned inertia and investment caution still rule the day.

The rapid adoption of global positioning system (GPS) technology within moving vehicles ranks up there with some of the most profound recent changes in transportation. Businesses and consumers alike are now well aware of the advantages of knowing where they are. Price points of GPS are coming down and the general precision and reliability continue to improve, but market demand for better and cheaper approaches for simply locating vehicles puts constant strain on the 1970's era model of GPS. For the purposes of this disclosure, this may be referred to as the "location awareness pull".

Transportation infrastructures have likewise witnessed a relatively rapid adoption of automated methods and technologies, most noticeable to the public in traffic flow coordination through traffic lights. The agenda and burgeoning of the annual World Congress of Intelligent Transport Systems (ITS), reflecting a wide range of global innovation, shows that there is a great deal more to it than automated and advanced traffic lights. For the purposes of this disclosure, this may be referred to as the "ITS thrust".

Dedicated Short-Range Communications (DSRC) and the community surrounding its development generally encapsulate the growing trend toward having vehicles simply communicate between each other and the transportation infrastructure. The list of applications for this communication is broad and overlaps quite a bit with the ITS application list. For the purposes of this disclosure, this effort may be referred to as the "DSRC thrust".

Vehicle Infrastructure Integration (VII) and the National VII Coalition is a relatively recent technical and community synthesis effort aimed at coalescing many of these powerful macro-development trends in the $21^{st}$ century transportation industry. The general notion is that vehicles and the infrastructure need to become coordinated and develop together as an overall system.

Focusing on traffic flow management specifically, and traffic light management even more specifically, magnetic loop sensing built into roadways has long been used, among other raw-data sources, for real-time intelligence on traffic light switching. Other forms of sensors, including cameras and sensors tuned specifically to emergency response vehicles also have been deployed. A recent example in this area is the company Aldis Inc., which is commercially releasing its "GridSmart" line of intersection-based fisheye cameras intended to much better understand traffic flows in and around intersections (e.g., better than magnetic loops). Loops, cameras and other forms of sensors have the distinct advantage that they simply work, while it is their cost structures that currently place extreme limits on any exponential expansion on their deployments. They also suffer from inherent passivity, in that pro-active communications between participants is not generally possible, or at least not practical and cost effective.

The need for more sources of real-time data is clearly coming into focus as a barrier to achieving the grander visions of the transportation community. A range of academic, governmental and commercial efforts are accordingly focused on this raw-data requirement.

SUMMARY OF THE DISCLOSURE

This disclosure, at a basic level, addresses the requirement for better real-time raw data. In the process of describing this approach, this disclosure outlines several specific applications that become enabled once a reliable supply of position or timing data becomes readily available to networks.

In one embodiment, a mobile device positioning system determines ranges between a plurality of communication devices, including at least one mobile communication device. A method includes receiving, at a first communication device, receive messages transmitted from a plurality of other communication devices. Each receive message includes a transmit count stamp corresponding to a remote counter value at the transmission of the receive message from the corresponding other communication device. The mobile communication device generates a receive count stamp for each receive message corresponding to a local counter value at the receipt of the receive message. As the mobile communication device travels along a path relative to the plurality of other communication devices, the method includes dynamically associating and disassociating the mobile communication device with a plurality of sub-groups of the plurality of other communication devices. The associating and disassociating are based at least in part on receiving receive messages from a predetermined number of other communication devices for each sub-group. For each sub-group currently associated with the mobile communication device, the method includes generating range estimates between the mobile communication device and the other communication devices in the particular sub-group. The range estimates are based on a combination of the transmit count stamps and the receive count stamps.

Additional aspects and advantages will be apparent from the following detailed description of preferred embodiments, which proceeds with reference to the accompanying drawings.

DETAILED DESCRIPTION OF PREFERRED EMBODIMENTS

I. Introduction

Figure 1:
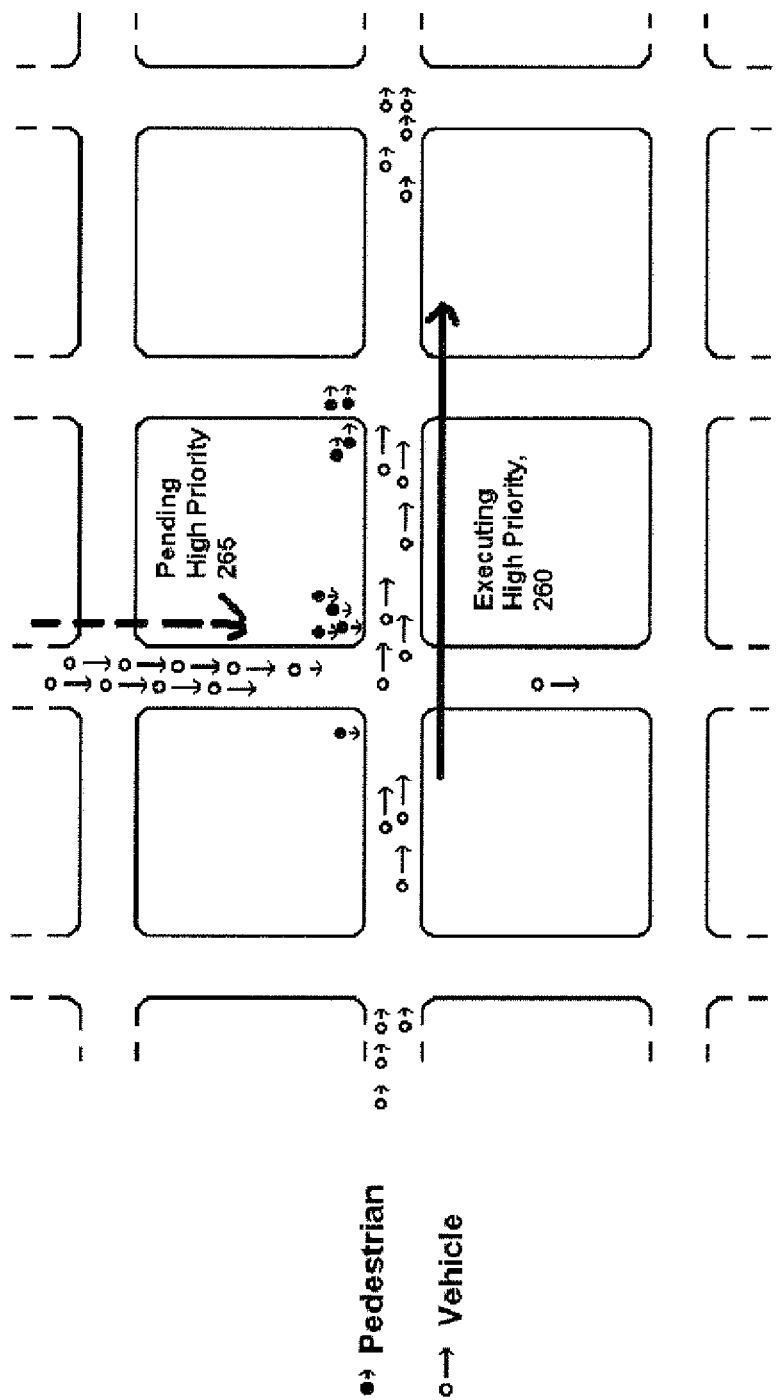
FIG. 1 is a schematic diagram illustrating vehicles and pedestrians traveling within a simplified urban grid of streets according to one embodiment.

GPS receiver integration into moving vehicles has rapidly evolved. Separately, equipping vehicles with wireless communication capabilities is an up and coming technology. The combination of the two in, for example, real-time traffic flow measurement and traveler updating, is becoming broadly available. The disclosure herein prescribes an approach to taking a next step in location awareness for vehicles and the transportation infrastructure, ensuring that any vehicle will know where it is at any time, anywhere, with a precision and reliability much greater than is possible with GPS, all at a lower cost than GPS. "Opt-in" incentives for a given vehicle to share its position information within a network enable a wide range of applications that benefit the vehicle driver and/or commercial owner, as well as society in general, most notably in reduced fuel consumption and potentially radically reduced operating costs. Anonymous and/or receive-only configurations are also described. Building highly reliable location awareness into vehicles can be a useful technology instigating a blossoming of a wide range of initiatives that the Intelligent Transportation System (ITS) global professional community has been pursuing. This disclosure explains the pragmatic details of building and deploying the components of such a system, with particular focus on infrastructure-side toolkits designed for transportation managers, engineers and technicians, while vehicle-side components are covered in both this disclosure as well as companion disclosures.

For example, aspects of certain embodiments are described in (referred to collectively herein as the "related disclosures") U.S. Pat. No. 7,876,266, titled "Harmonic Block Technique for Computing Space-Time Solutions for Communication System Network Nodes," issued Jan. 25, 2011 to Geoffrey Rhoads, U.S. Patent Application Publication No. 2010/0202300, titled "Systems and Methods for Space-Time Determinations with Reduced Network Traffic," filed Feb. 12, 2009 by Geoffrey Rhoads et al., U.S. Patent Application Publication No. 2009/0213828, titled "Wireless Local Area Network-Based Position Locating Systems and Methods," filed Apr. 23, 2009 by Trent J. Brundage et al., U.S. Patent Application Publication No. 2009/0233621, titled "Systems and Methods for Locating a Mobile Device within a Cellular System," filed Apr. 20, 2009 by Geoffrey B. Rhoads et al., and U.S. Provisional Patent Application No. 61/366,413, titled "Multipath Compensation within Geolocation of Mobile Devices," filed Jul. 21, 2010 by Geoffrey B. Rhoads et al., each of which is assigned to the assignee of the present application and is hereby incorporated by reference herein in its entirety for all purposes.

The related ITS thrust, the DSRC thrust, and the VII efforts, once combined with the location awareness pull, defines the broadest context for this disclosure. In short, this disclosure includes a simple goal of allowing every vehicle to know where it is to sub-meter accuracy, 24/7 (e.g., approximately 24 hours a day, 7 days a week), and to do so with the highest reliability possible and the lowest cost possible.

Early deployments of this disclosure's approach may coexist with GPS-device implementations within vehicles. Certain embodiments may be considered as a parallel on-vehicle positioning system, where GPS and INS (Inertial Navigation Systems) have already shown the value of redundancy and cooperation in the raw-data production side of knowing one's location.

The related disclosures refer to certain aspects as "PhaseNet" technology. The basic idea is that the very act of one communicating device passing a normal message to another device can, after a relatively small number of networked messages being sent to and fro in a network, be used to produce a distance (alternately: a range) estimate between message sender and message receiver. A short sequence of such ranged messages between some small group of nodes then defines a geometrically and dynamically diverse set of ranges, where classic triangulation theory then takes over and local position estimates ensue. Detailed examination of this disclosure and the related disclosures show that this summary description in this paragraph is somewhat over-simplified, but the overall idea is largely correct.

No a priori constraints are placed on sending nodes and receiving nodes. For the vast majority of networking applications, then, a normal flow of normal messages between small groups (typically three to a couple dozen nodes) suffices to estimate any given node's position relative to the group. A wide variety of choices are available to translate intra-group position into absolute latitude and longitude forms, or to any other system framework form desired (e.g., city street grid nomenclature systems). Error-bars on position estimation are primary outputs of ongoing device software operations along with the position estimates themselves. To an extent that certain "normal message traffic" does not produce solutions meeting position-error specifications of some given application, it is a relatively simple matter to supplement normal message traffic with extremely low bandwidth additional message traffic, which is generated specifically to assist location determination error reduction. The actual central processing unit (CPU) requirements are similarly quite low, and the number crunching that produces solutions out of raw data inputs is not only minimal, but the actual CPU where that number crunching can take place is highly configurable, from the device itself to some server halfway around the world.

This disclosure's implementation within transportation infrastructures and vehicles is likewise, by design, highly configurable. DSRC efforts in particular are described as an example platform embodiment, not at all to suggest that other communication platforms are not equally capable of supporting the embodiments disclosed herein. The usefulness of describing DSRC as an example embodiment for this disclosure has multiple aspects: there is plenty of public domain materials describing how this system works; there are plenty of articulated visions of what this system can do once a good, reliable positioning system is in place (where GPS is already being used to provide early examples); and there is good reason to believe that DSRC or something very much like it will be a widely deployed technology over the next decade.

Thus, this disclosure provides details of deploying certain embodiments within the DSRC umbrella framework.

Certain embodiments result in "location awareness" being built into the fabric of how DSRC and VII systems work. Another way to put this is: DSRC may not simply be a system that enables communication, it enables positioning at the same time. This end result may be an issue of standards creation rather than one of prototyping and building early deployments, but if it can be done and it proves to be the de facto lowest cost approach to do it, one way or another it will be done, be it in a few years or over a decade. Thus, according to the embodiments disclosed herein, reference to a "communications network" may also refer to a "positioning network."

This disclosure may be referred to as a Location Aware Intelligent Transportation System. Evolved properly, and the term "location aware" may quickly become apparent from the disclosure herein to the next generation of transportation engineers graduating from the many schools that now have extensive programs in transportation system understanding and development. These two words could then be conveniently dropped off, getting back to the current ITS acronym and a historical footnote that there was an early few-year period where a need existed to be explicit that there were differences between systems that did and did not know where they were.

II. Physical Wireless Devices and Networks

As mentioned above, Dedicated Short-Range Communications or DSRC is used as an example communications platform for certain embodiments described herein. Also as previously mentioned, the basics of the embodiments disclosed herein should adapt to any networked communications architecture.

According to certain embodiments disclosed herein, a vehicle includes a device on-board that sends and/or receives signals. This is part of DSRC, where a duplex 5.9 GHz band vehicle-to-vehicle, vehicle-to-infrastructure and infrastructure-to-infrastructure communication system may be used.

III. Ping Drivers

Step one, according to certain embodiments, is to select a specific DSRC communication hardware approach and to determine how to "ping enable" the underlying chosen hardware. The following discussion treats the word "device" generically, not worrying about whether a communications device is on a vehicle or in the non-mobile infrastructure, e.g. a traffic light.

Ping enablement involves studying the specifics of how messages are sent and received on the chosen hardware device, and then determining an optimal approach to perform simple count-stamping (described further below) on outgoing and incoming messages. The related disclosures have described ping enablement at length: a ping driver, a component of software that interacts as closely as possible with the lowest level radio frequency (RF) circuitry and whose software execution is generally accomplished either by a low-level dedicated CPU within a communications device, or at some mid-level digital circuitry where basic instructions can be sent to the RF circuitry to perform routine tasks and return data results.

One task of the ping driver is to "count-stamp" either all outgoing and/or transmitted messages, or some specific fraction of outgoing messages. Thus, the hardware includes some existing free running counter, which virtually all modern communication devices have, typically "tied" to a CPU's clock or some local oscillator, i.e., harmonically locked to some clock/oscillator as is well understood in the art. The counter counts, at some points hitting a count limit and resetting to zero, but generally incrementing its internal instantaneous discrete value by one, as driven by an oscillatory signal. A task of the ping driver is to fetch a discrete count value from the counter at some pre-specified point in an outgoing message's processing sequence. This selection of an agreed point to fetch a count-stamp is similar to how GPS signal processing is performed, where for example the "start of a pseudo-noise sequence" becomes an arbitrary shared reference point. The mentioned "zero reset" occurrences of the counter are a nuisance but easily dealt with in later processing steps, and the ping driver need not trouble its basic tasking by this issue. Generally, there may also be no need to try to interpret counter numbers as "time". Indeed, it may not be considered a "time" as it only represents the various wanderings of a monotonic local counter.

As mentioned, the count value is fetched at some pre-designed specific point in the processing of an outgoing message. In parallel, the outgoing message generally has some discrete index value associated with that particular message, e.g., message #4385, which then might be followed roughly 90 milliseconds later by message #4386, and then roughly another 60 milliseconds later by message #4387, etc. A task of ping driver is to fetch a counter value and associate that value with the outgoing message unique identifier. Another task of the ping driver is to either store sequences of these count/ID pairs and report them to a higher level process in batches, or to simply report up count/ID pairs as they occur. Flexibility to adapt to different approaches for different hardware may be considered: i.e., to cause minimal processing overhead and do the right thing for the hardware in question. Note also that outgoing messages need not be uniform and generally are expected to be sporadic, which for most applications is normal.

Another task of the ping driver is to perform substantially the identical count-stamping task on either or both of: a) received messages from other nodes, whereby the entire message is sensed and properly decoded; or b) messages sent from other nodes that may not necessarily be intended to be fully decoded by the receiver, but which the receiver can nevertheless "partially decode" for the purposes of extracting a received ping count stamp. The basic idea is that all received data is good data, and even if a given vehicle is having a direct data communication exchange with some infrastructure node that is not intended for other vehicles, other vehicles can nevertheless benefit from simply "partially listening in" on at least the ping-aspects of the communications going on.

Appropriate anonymity and security protocols can easily be put in place such that only the ping-level information is being decoded, for the good of all concerned. Even an "agreed ping point" can be secret and only shared in secured sessions, ensuring that random listeners cannot exploit ping traffic if that is what a given group so chooses.

This distinction between a fully decoded received message and a partially decoded message is a pragmatic device-level issue, not affecting the main software routines. At the device level, it simply means that a receiver that otherwise has been "taught" to not decode messages not intended for itself, may be retaught (i.e., reprogrammed) to at least listen for and count stamp what is referred to as ZTChatter, or Zulutime Chatter (the concept of "Zulutime" for a group of nodes is discussed below). By attempting to count-stamp such chatter, and then through later described processes whereby a given vehicle discovers it is cooperating with several other vehicles as a group, such stored ping count-stamp data becomes highly useful toward improving the accuracy and reliability of everyone's location solutions, including their own solutions. At the system level of solution processing, the only difference in increasing the sources of raw ping data is "more data to crunch on", which, as mentioned, is generally quite minimal in the first place relative to the data crunching capacities of even low-end modern CPU's.

IV. PhaseNet Software

In certain embodiments, each participating node in a transportation system includes a ping driver as described in the previous section, which may be controlled by a main software program functioning on the device. This main program is described in the related disclosures, and this disclosure discusses its particular implementation in highly dynamic transportation applications.

On this note about how the core software is specifically implemented in mobile transportation applications, it may be noted that an aspect of this implementation revolves around the exceedingly dynamic nature of traffic, especially in urban cores. At a software level, this translates into a baseline requirement that any software solution should handle changing and evolving network topologies (the underlying connectivity of nodes to other nodes) at the cutting edge of what past network solutions have had to contend with. The issues are ten-fold or hundred-fold more involved than those encountered when a random public access point needs to accommodate the latest laptop flipped open in a Starbucks®. Vehicles will simply be routinely travelling dynamic webs of connectivity. VII, DSRC and various ITS efforts know this issue well.

This disclosure outlines and then describes a guiding philosophy, and related implementation details, which may be referred to herein as "topographic oozing" or "topographic dynamics". At a philosophical level, it is in the same category as "hand-offs" in the cell industry. A basic requirement is that a mobile client needs to experience smooth and reliable levels of service even as it travels through a thicket of fixed server locations.

One embodiment tasks the vehicle-client with continual searching for at least two separate local groups to belong to, and possibly three or even more. The idea and implementation of local groups will be described further below and in the figures, but suffice it to say in this summary that they represent highly dynamic local webs of connections that coalesce in a temporarily cooperative group, and each node in general is encouraged to belong to several groups at the same time. The core software is designed to not only accommodate this but encourage it.

Figure 6:
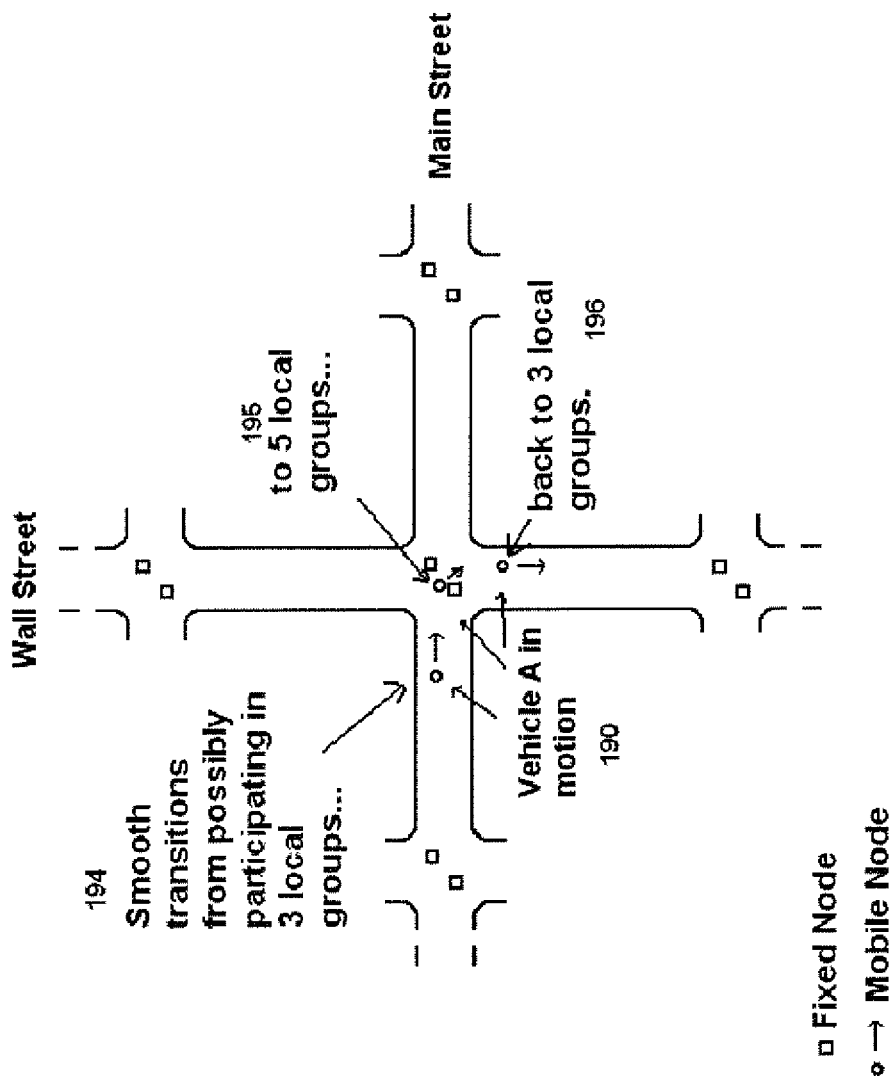
FIG. 6 is a schematic diagram illustrating the concept of "topographic oozing" according to one embodiment.

Skipping ahead in the linear introduction of the figures to FIG. 6, there is illustrated but one example of how a car turning a corner goes from belonging to three local groups coming up to an intersection, through a two to three second period where it then actually belongs to five groups, then goes back to belonging to three groups after it has rounded the corner. All the while that it is doing this, the individual local group behavior of some isolated group (e.g. the group defined by a single intersection) routinely accepts these comings and goings of participating members, and the vehicle itself just keeps cranking out position solutions that for all intents and most applications appear quite smooth and reliable. Deep under the hood of the number crunching, the details of the error ellipsoids of the position solutions do indeed dance around quite a bit, but this dancing can be designed to be well below whatever system-level positioning error gross metric has been specified by the given application. Also as stated earlier, the ongoing measurement of these error bars is included in embodiments disclosed herein, and both devices and groups will know if and when application specifications are being violated and reporting this situation as an error condition accordingly.

A final note on the core software before transitioning to the figures and more detailed discussions is that these network behaviors are, in certain embodiments, what many refer to as "emergent", meaning that there is no "master server" sitting in some dark and dank basement inside city hall, cranking away and making the whole thing work. Each node, whether fixed or mobile, is effectively running the same core software. It is the configurations on individual devices which render each node's group behavior more "server-like" or more "client-like" or some designed blend of the two. Likewise, the local group itself is a completely temporary concept, sometimes only coming into existence for a few seconds and then going away, all based on individual configurations of the participant nodes. For urban core applications keying in on street intersections, local groups are generally much more "permanent" at first glance, but their underlying software basis is effectively temporary and only instantiated through group cooperation.

V. Urban Core Example Embodiment

FIG. 1 is a schematic diagram illustrating vehicles and pedestrians traveling within a simplified urban grid of streets according to one embodiment. The essence of the underlying networking topologies and dynamics nicely extrapolate to suburban settings and intertwined-highway settings as well, and hence the following material equally applies to these settings. Flow-Volume and Flow-Vector-Weighting can greatly enhance traffic flow management algorithms which have largely been developed around statistical flow timing and magnetic sensors in the pavement. Anonymous 'opt-in' participation by mobile nodes, incentivized by self-interest, ensures a high enough sampling of actual vehicular and pedestrian flow to produce quantifiable reductions in fuel consumption and emissions for all mobile traffic.

Figure 2:
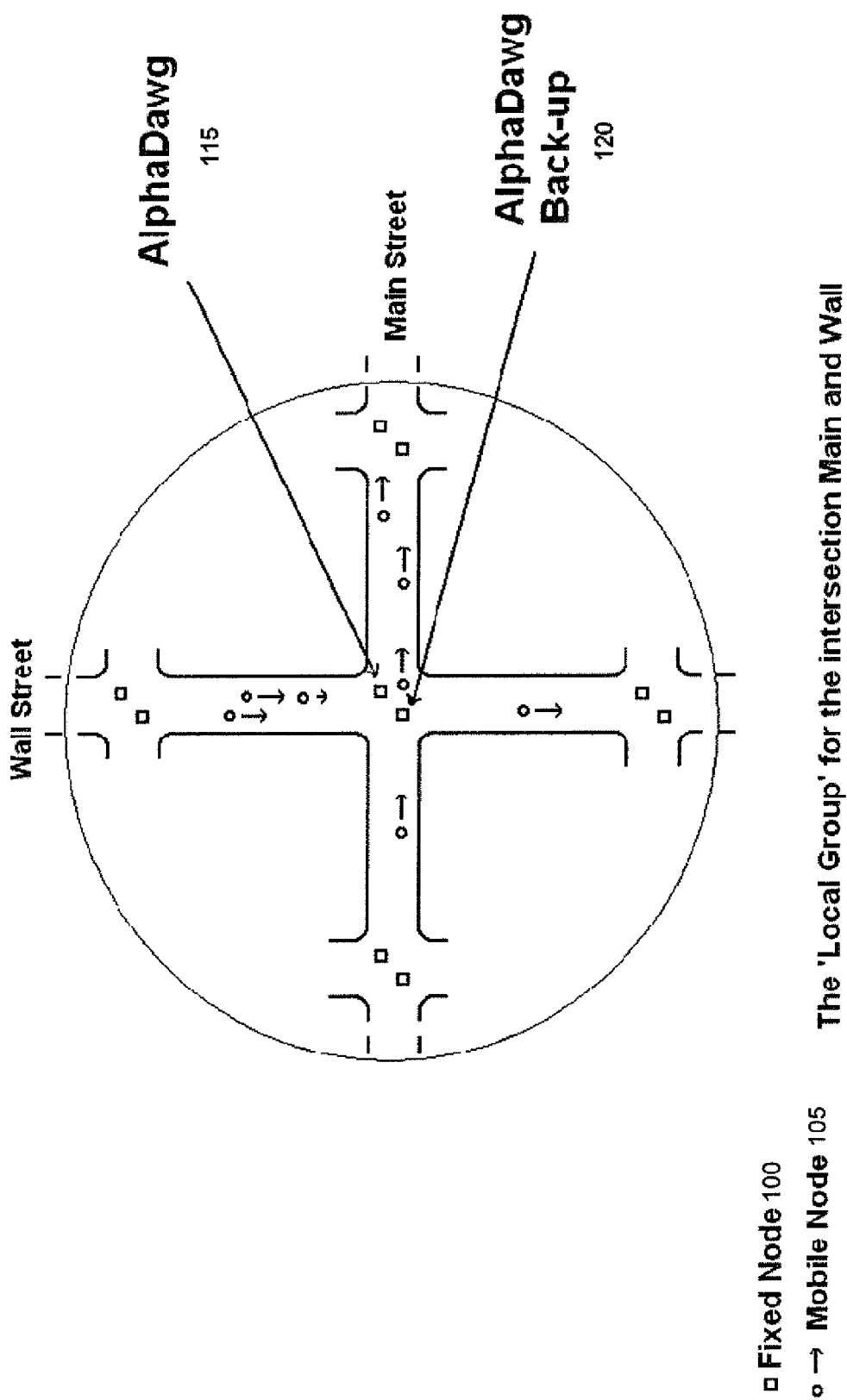
FIG. 2 is a schematic diagram illustrating fixed nodes and mobile nodes of a local group corresponding to an intersection of two streets according to one embodiment.

Although not shown in FIG. 1, certain embodiments include two fixed nodes per intersection (see, e.g., FIG. 2). Traffic lights, for example, may be used fixed nodes, as several companies are already targeting this equipment for communication system deployment. The choice of two fixed nodes per intersection, over having just one, is only a choice of prudence and redundancy, with the presumption that these devices may become inexpensive as commoditization pressures reign. In certain embodiments, one fixed node per intersection is sufficient. Any location with a reasonable line-of-sight communication view of the street corridor can be used for the one or more fixed nodes. Multipath issues are dealt with at length in one of the related disclosures, and while they play some role in selecting locations, this role is generally secondary to basic cost, power supply and other pragmatic considerations.

FIG. 1 also limits the number of graphically depicted moving vehicles to simply keep things uncluttered but illustrative. Although not shown in FIG. 1, the various nodes (devices corresponding to the vehicles, pedestrians, and fixed nodes) are in sporadic communications with various other nodes, typical of a communication network. Later figures will attempt to graphically show a few examples of this.

In certain embodiments, it is the fixed nodes that usually initiate and loosely manage local cooperative group processes, while mobile nodes (e.g., the vehicles) generally travel around attempting to make several concurrent associations with more than one local group as previously stated. FIG. 2 is a schematic diagram illustrating fixed nodes 100 (represented by squares) and mobile nodes 105 (represented by circles) of a local group corresponding to an intersection of two streets according to one embodiment. FIG. 2 is an oversimplified but clear depiction of an instant in time where a given local group is in operation, associated with the intersection of Wall Street and Main Street. FIG. 2 highlights the distinction between nodes/devices 100 in a transportation network that are largely fixed and are generally part of the so-called infrastructure (shown as squares), and nodes/devices 105 that are the mobile participants in the transportation system (shown as circles), generally the vehicles. Here, one particular node has been configured to take on the temporary role of "AlphaDawg" 115. Any node in the group can play this role, and indeed, its tasking may be equally shared amongst the group in certain embodiments. But, for simplicity reasons it is practical to assign to one node certain organizing tasks and the bottom line role of trying to maintain the health and functioning of the local group associated with the intersection of Wall and Main.

The related disclosures go into more details on the tasking involved with instantiating and maintaining a local group. To summarize here, the AlphaDawg 115 is in charge of initiating a group session, beginning and maintaining a certain level of communications traffic forming the minimum requirements for a group to call itself an active local group, and generally speaking serving as a group resource for all nodes in the local group. Thus, the AlphaDawg 115 has certain server-like tasks. Additionally, FIG. 2 depicts an AlphaDawg backup 120, which acts as a backup to the AlphaDawg 115. The AlphaDawg backup 120 is ready to take over at a moments notice, typically within one tenth of a second or sooner, if something goes wrong with the AlphaDawg 115. Even in such switches, raw ping data is still being collected by all nodes and any such changes in group management will not affect the ability to produce ongoing solutions and associated solution error ellipsoids.

Figure 3:
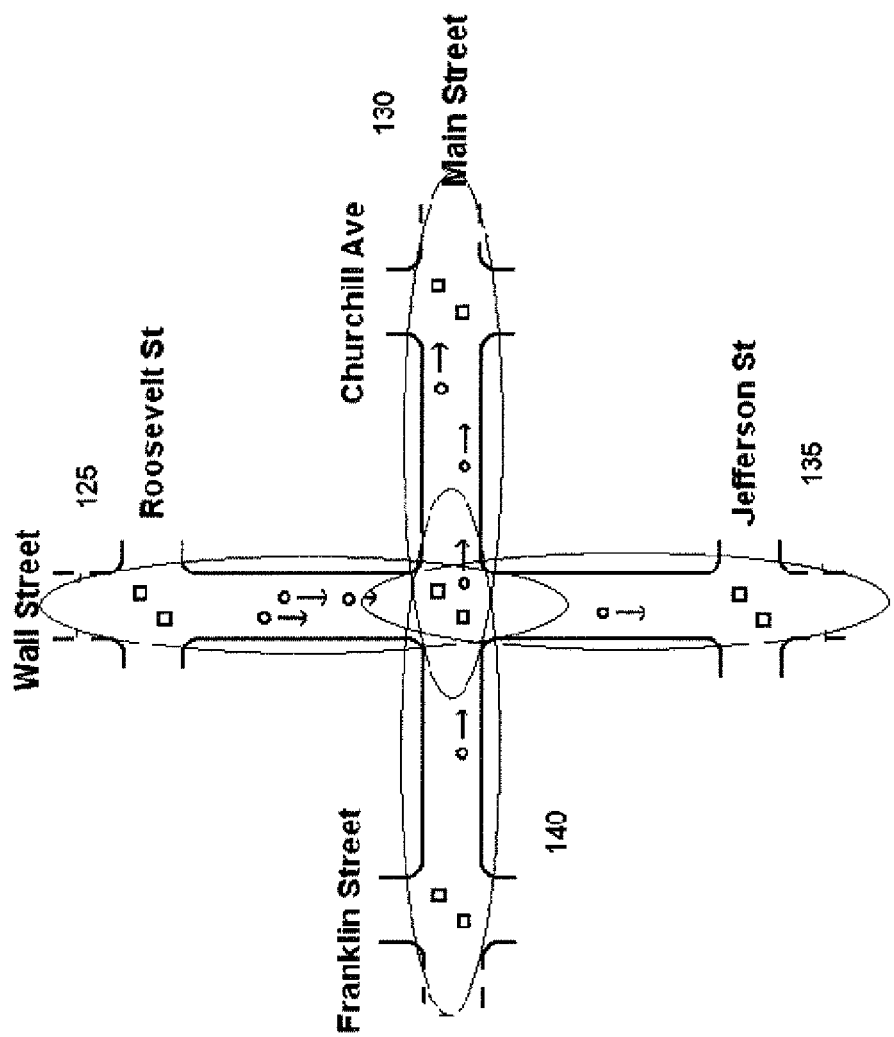
FIG. 3 is a schematic diagram illustrating relationships between neighboring local groups according to one embodiment.

In FIG. 2, the four immediately neighboring intersections and each of the two fixed nodes at those intersections are included in the Wall and Main's local group definition. FIG. 3 is a schematic diagram illustrating relationships between neighboring local groups (schematically defined by respective ellipses) according to one embodiment. In this example, each intersection's Fixed Nodes not only define and manage their own local group, they also participate as non-AlphaDawgs in neighboring local groups. FIG. 3 shows that the neighboring fixed nodes are explicitly included in Wall and Main's local group, even though they themselves are the anchor (AlphaDawg) nodes for their own respective intersections. Likewise, the two fixed nodes at Wall and Main are non-AlphaDawg members in four other local groups, e.g. Wall and Roosevelt 125, Churchill and Main 130, Wall and Jefferson 135, and Franklin and Main 140. So, even here it can be seen that the fixed nodes as well tend to belong to several groups, variously taking server-like roles or simply basic participating node roles. The CPU and communication overhead aspects of this multi-group affinity are discussed below, but for now it suffices to say that the processing-load and communication-load issues are non-trivial engineering matters but ultimately easily managed.

Figure 4:
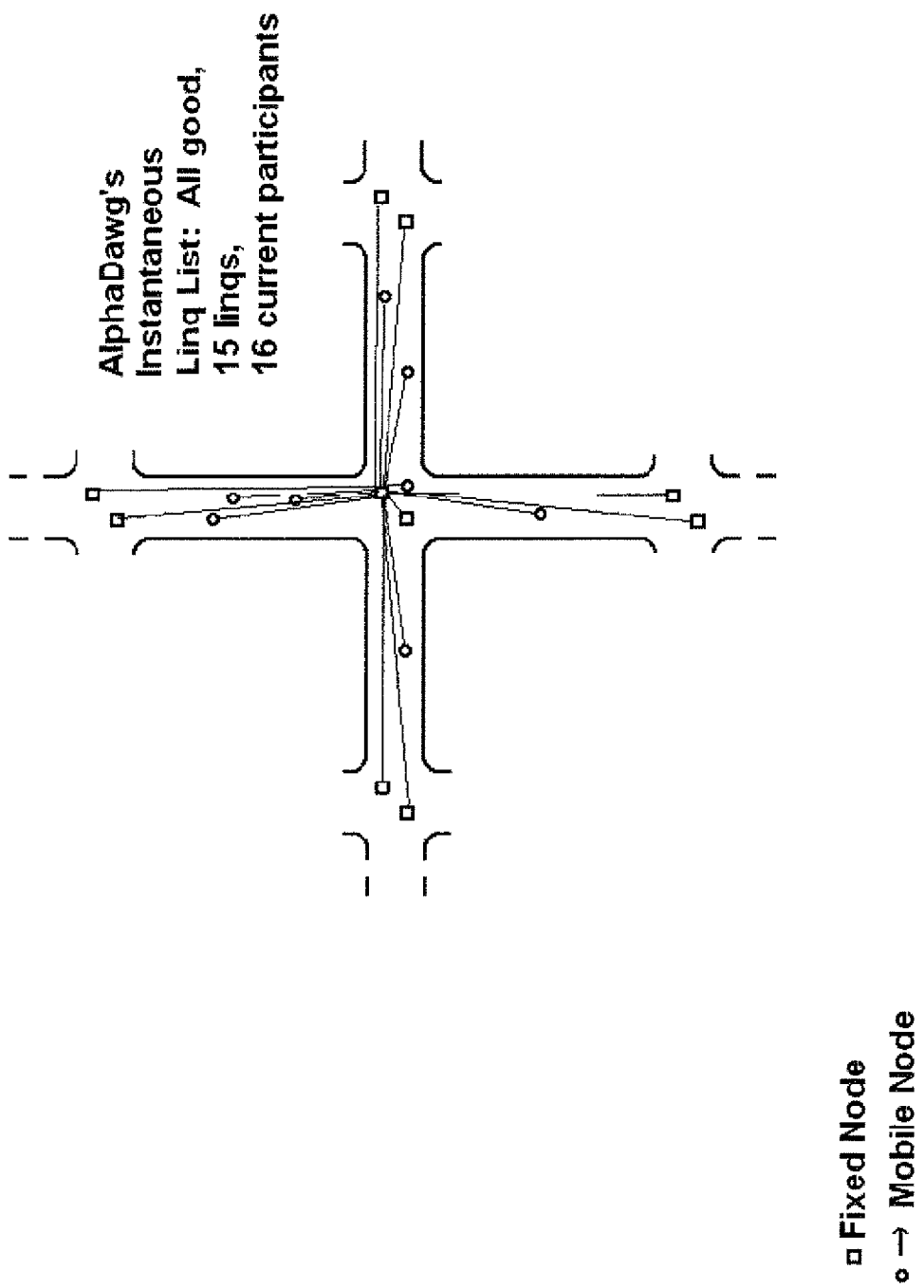
FIG. 4 is a schematic diagram illustrating an instantaneous view of an example "linq list" for the AlphaDawg node according to one embodiment.

FIG. 4 is a schematic diagram illustrating an instantaneous view of an example 'linq list' for the AlphaDawg node according to one embodiment. This diagram depicts a snapshot in time of the active, duplex communications between the local group's current AlphaDawg and other members of the local group. In FIG. 4, the lines depicted show that the AlphaDawg currently believes that it has active communications with (or, alternatively, some form of receive (rx)-only, transmit (tx)-only or rx/tx signaling relationship with) fifteen (15) other nodes within the context of its Wall and Main local group, and it believes that all communications are in good working order. The related disclosures explain the 'q' on the word linq, mainly having to do with this word distinctly encapsulating the unique properties of a ping-enabled communication link and its inherent information-sharing properties. As a practical matter, the AlphaDawg's linq list is usually identical to the local group's temporary member list, minus one, being the AlphaDawg itself. The Alphadawg node maintains a copy of both lists.

FIG. 4 uses the word "duplex" to describe the active linqs. This only represents one embodiment and does not at all need to be the actual case in every embodiment. Indeed, a combination of monoplex and duplex channels can be accommodated, whereby individual nodes can still determine their positions.

Figure 4A:
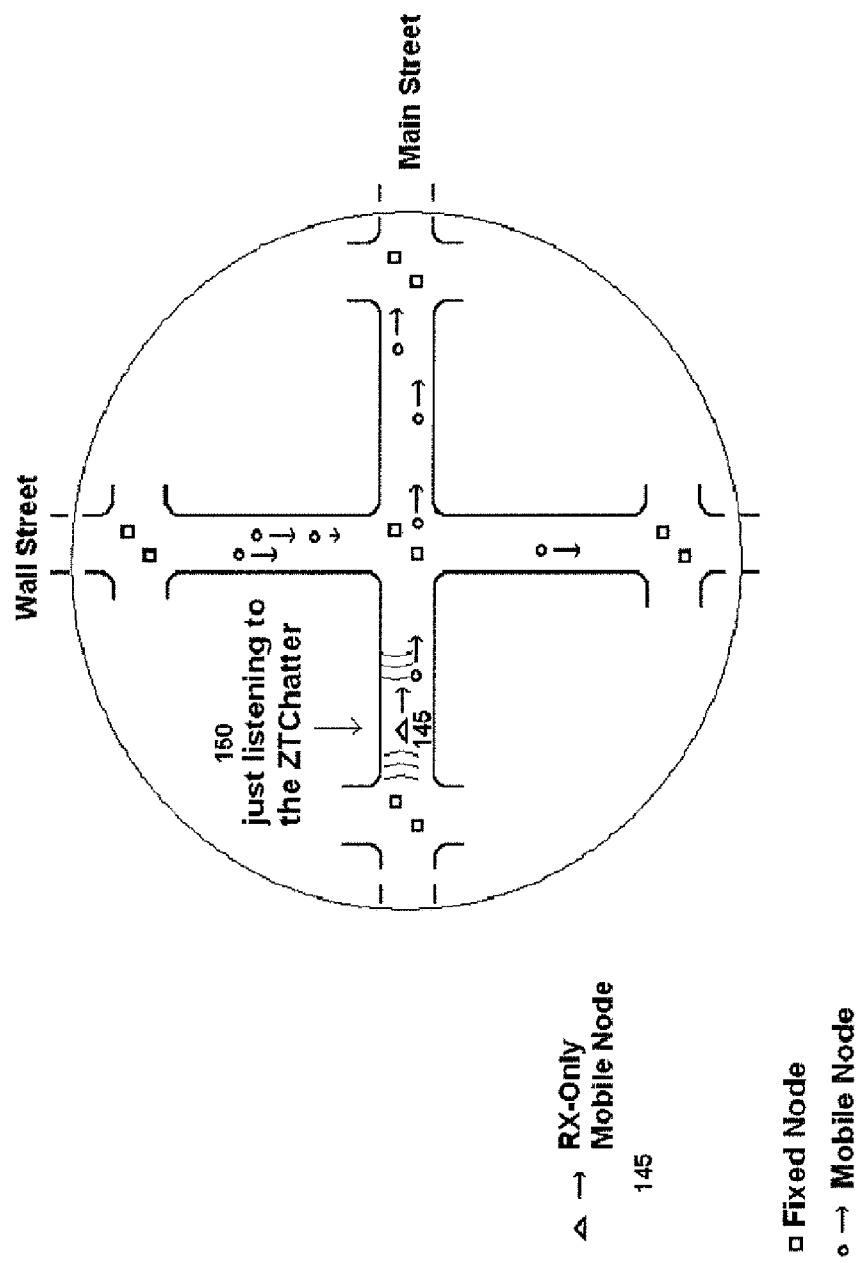
FIG. 4A is a schematic diagram illustrating a rx-only mobile node, according to one embodiment, that only listens to ZTChatter yet can nevertheless become fully enabled to determine its ongoing position.

One example of the combination of alternatives to full duplex linqs is depicted in FIG. 4A, which is a schematic diagram illustrating a rx-only mobile node 145 (represented by a triangle) according to one embodiment that only listens to ZTChatter yet can nevertheless become fully enabled to determine its ongoing position. Receive-only participation is entirely possible. The triangle icon node 145 is simply listening to all the "public domain" ZT Chatter within the Wall and Main local group, gathering sufficient information to rapidly determine its position. If the rx-only mobile node 145 is just listening (see note 150 in FIG. 4A) to other communications and not itself communicating, then the local group will know nothing of its existence. Yet on the node 145 itself, running the same ping drivers on the received signals and running the same core software described in the related disclosures, H matrices can be formed using one-way channels alone, unknowns to the various entities can be created, and position solutions can be formed.

Helpful, but not entirely necessary, is that part of the ZTChatter can include general information concerning knowledge about the local group, including the a priori known positions of the fixed nodes. But this is simply the start of what might be broadcast in the pung packets of ZTChatter. Post-solved delta-Zulutime "DZT" solutions for the fixed nodes and possibly even the mobile nodes can also be broadcast; even though these solutions may be a bit "dated" by the time they are broadcast, referring to effectively "five or ten seconds ago in the past". The nature of even commercial oscillators are that their additional clock wander in the ensuing few seconds is not terrible, e.g., only a few tens of nanoseconds from a perfect clock, and hence these "just published" DZT values of various nodes can be quite useful. With such ongoing time updates being broadcast, the ultimate effect is similar to traffic lights becoming as stable a time source as a GPS satellite itself. In other words, the traffic light's device clock can go about its normal time wandering and jitter, but it is at the same time publishing a very good DZT signal, allowing any listening client to apply the correction to its time and get a time value very close to GPS time (see FIG. 9 and its associated descriptive text to see how this relationship to GPS time can be achieved).

Thus, FIG. 4A represents a sub-class of this disclosure, where if certain municipalities so choose for whatever reasons, they can set up their infrastructure nodes to be broadcast-only nodes, all either actively synchronized to GPS directly or post-facto synchronized to GPS through ongoingly broadcast DZT solutions. Such a solution has less ultimate power and less flexibility than the full duplex version of the disclosure, but it has the virtue that it can be made to work in early pilot projects and to require very little in the way of standardization. Clients in such a system look more and more like GPS receivers, except that they are tuned to whatever frequency and communication protocols are chosen for the municipal beacon system. The number crunching they need to perform in order to derive their positions may require treating their own internal clock as an unknown, just like in GPS receivers.

Figure 4B:
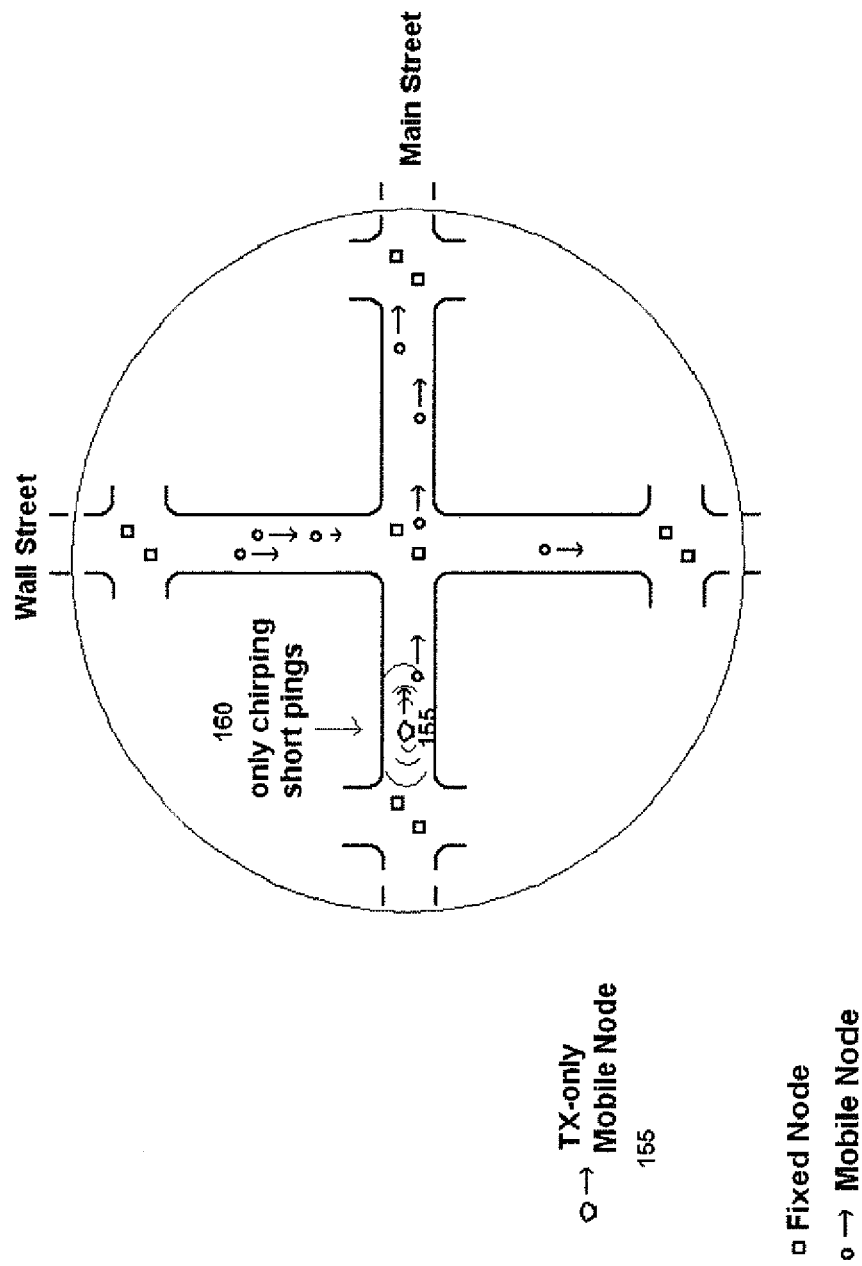
FIG. 4B is a schematic diagram illustrating a tx-only mobile node according to one embodiment.

FIG. 4B is a schematic diagram illustrating a tx-only mobile node 155 (represented by a pentagon symbol) according to one embodiment. Transmit-only (TX-only) nodes are also quite supportable. Either just AlphaDawg or the entire group can choose to acknowledge and/or utilize the information inherent in the short ping chirps emanating from the TX-only node. It may or may not become a virtual member of the local group, all depending on the application and how AlphaDawg runs the local group. FIG. 4B is a kind of polar opposite situation to that depicted in FIG. 4A. In FIG. 4B, the tx-only mobile node 155 simply chatters away in a pre-defined way (see note 160 in FIG. 4B), oblivious to the world and oblivious to any notions of the local group at Wall and Main. FIG. 4B uses the word 'chirp' as well, though the idea is that the chirping in question conforms to some pre-defined communication standard, presumably the same or similar standard as is used within the local group's communication protocol. One challenge arises in this situation whereby if there are a plurality of nodes such as node 155 all chirping away, then that might become a whole lot of asynchronous chirping cacophony with chirps potentially conflicting with each other. There are certainly ways to get the functional requirements of chirps to be very small and compact, and hence the message packets of a chirp are short in time (e.g., 10 microseconds per chirp). In certain embodiments, a transmitting node need only chirp about only once a second or a few times a second. Another option is that chirping circuitry may at the very least have very basic receiving circuitry that can hear other chirps for the purpose of scheduling its own chirps (minimizing contention and overlaps of chirps). All of these options can be accommodated by the primary PhaseNet software running on the local group members (or just the fixed node members, listening for the chirps).

One might ask the natural question: what benefit is there to the vehicle to do this chirping? Of many good answers, perhaps the simplest answer is the most colloquial: "I want that light that I'mapproaching to turn green!" Yet another hybrid embodiment is: "chirp back at me if you feel I might be heading into a dangerous situation such as a collision," where this example indicates that some form of back-communication to the chirping device might be possible. In other words, a Tx-only chirping node 155 can gain benefits from the environment by announcing its presence, just as when a car rolls over a magnetic coil at a stop light, it is signaling its presence to the traffic control system.

Thus, such a system may become an opt-in, anonymous, and pro-active replacement to magnetic loops in pavement announcing the coming of going of vehicles. Again, this embodiment denies certain broader capabilities of the full duplex version depicted in FIG. 4 and earlier described, but it too has the advantage that it can simply work, and pilot projects or early deployments can minimize the requirements for inter-operability that otherwise come with the more powerful full duplex version.

The so-called chirping device inside the vehicle may be very inexpensive, on the order of a dime or two for a throw-away, postage-sized package. At the very least, infrastructure nodes are attuned to the chirping, count-stamp the incoming chirp messages, and follow the prescribed methods of calculating position solutions for the variously sensed chirpers. What these fixed infrastructure nodes do with these identifications and positioning of chirpers is wide open, beginning as it might with assistance in controlling traffic light signaling. This is the tip of the iceberg of course, and a reasonable subset of the broader benefits of this disclosure can also accrue to this transmit-only device architecture.

As discussed above, in both the rx-only model and the tx-only model, each can system can indeed function within their respective limitations. This disclosure, however, will continue to focus on the full suite of capabilities of the duplex model of device communications. It may inevitable that certain applications will for one reason or another gravitate toward non-full-duplex implementations, including rx-only and tx-only implementations. For example, military or intelligence applications may require certain rx-only implementations for classic covert reasons. This disclosure's continued discussion on the full duplex system is only for the purpose of describing the full duplex embodiment and should not be construed as weighted toward expected deployed solution configurations. The combination of duplex/monoplex embodiments mentioned earlier, and fully supported by PhaseNet core software, is expected to be extensively utilized in practice.

Figure 5:
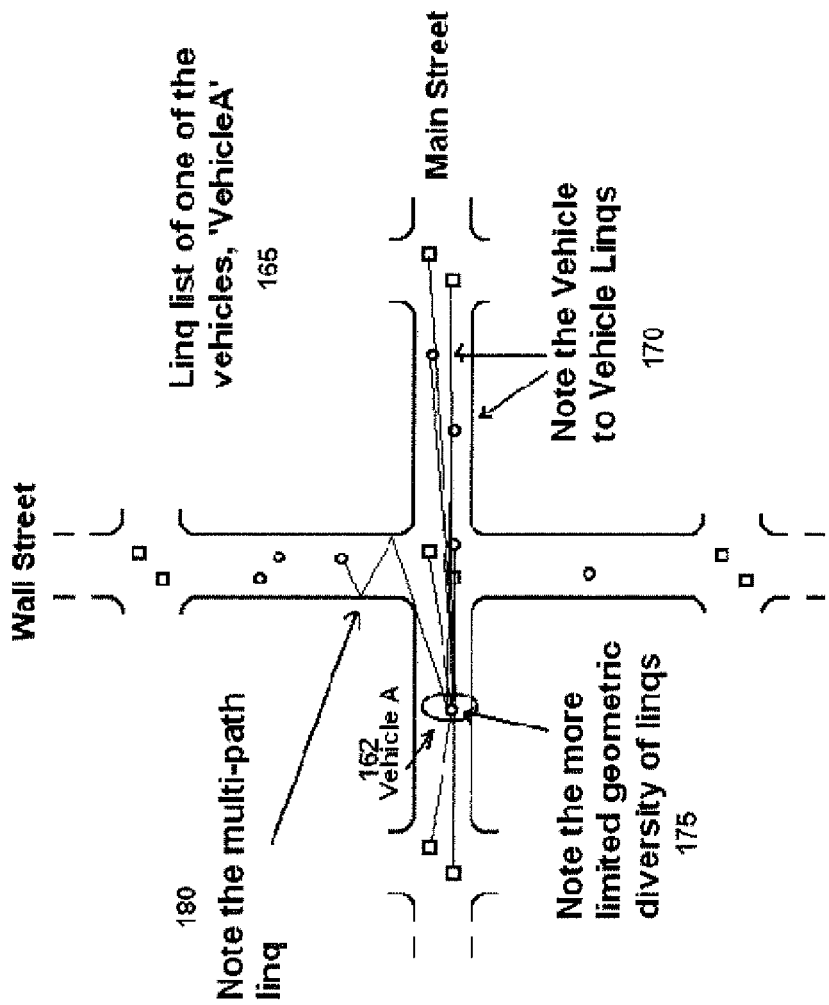
FIG. 5 is a schematic diagram illustrating a full-duplex, according to one embodiment, to describe practical considerations of how a given vehicle participates in an overall scheme.

FIG. 5 is a schematic diagram illustrating a full-duplex according to one embodiment to describe practical considerations of how a given vehicle participates in an overall scheme. First, FIG. 5 is the graphic representation of the linq list for a chosen vehicle A 162. See note 165 in FIG. 5.

Notice that this particular node, vehicle A 162, in the local group only has a duplex relationship with a sub-set of members of the Wall and Main local group, represented by the straight lines connecting the vehicle to other nodes. These lines generally represent that two nodes are actively exchanging and mutually count-stamping pings. In this example, Vehicle A 162 can communicate pings with all nodes along Main street, including the fixed nodes behind it and the fixed nodes at the intersection beyond Wall street. It also found a way to sneak around the corner and establish an ephemeral ping-exchange with another vehicle on Wall street, a clear example of a multipath signal 180. Note 170 in FIG. 5 asks us to take particular note that in this full embodiment example, vehicles indeed communicate pings with each other, not just the fixed infrastructure node.

Note 175 in FIG. 5 brings up the notion familiar to GPS engineers of "geometric diversity" of linqs. In any triangulation situation, it is ideal to be receiving pseudo-range estimations from all directions. But, clearly in the case of an urban street corridor, the resulting geometric diversity is highly constrained at best. A depiction of the ellipse surrounding the vehicle 162 graphically indicates a resulting asymmetry of error in position estimation caused by this geometric concentration of pseudo-ranges along the street axis but not along the perpendicular axis. An aspect of this disclosure is that the error geometry, also known as Dilution Of Precision or DOP in the GPS world, is constantly being estimated right alongside the position estimates themselves. For certain applications such as collision avoidance or forensic accident analysis (as but two of many applications), this estimation of error is very useful.

Looking at note 180 in FIG. 5 again, a hypothetical graphic is shown to illustrate how an electromagnetic signal between vehicle A 162 and a vehicle travelling on Wall street might still establish communications even though they are not in a line-of-sight relationship with each other. An entire separate related disclosure is devoted to the topic of multipath, where for this disclosure's purposes, suffice it to say that such linqs are still quite useful to improving the overall quality of position solutions for the group, so long as they are treated appropriately in the solution software routines and not treated as line-of-sight linqs. The related multipath disclosure describes ways to discover the difference between multipath signals and line of sight signals.

Vehicle A 162 can participate as a member in three separate local groups if it so chooses. For example, vehicle A might participate in up to three separate local groups defined by the three intersections it is in contact with. The local group on Wall and Main depicted in FIG. 2, but also the local groups defined by the two other intersections along Main Street. As discussed herein, there is no reason in certain embodiments to limit the number of group associations to only three.

VI. Topographic Oozing

FIG. 6 is a schematic diagram illustrating the concept of "topographic oozing" according to one embodiment. 'Topographic Oozing' as opposed to 'Hand-offs' is the operative concept behind how vehicles travel through fixed-location group after group. For the more formal people studying this disclosure, an alternative way to describe an approach of this disclosure for dynamic re-associations of a moving vehicle might be, e.g., fluid, layered redundant group association dynamics, itself shortened to "topographic dynamics." For purposes of discussion, this concept is referred to herein by the shorter phrase "topographic oozing."

The broad context here is: vehicles move through urban cores (and everywhere else), passing through dozens if not hundreds of local intersections and their associated local groups. The engineering challenge is to turn what on its face might be a nightmare "hand-off" situation if we attempt to apply classic cell-phone-cell-tower techniques, into a powerful and useful thing through continual software processes that are ongoingly seeking new groups to join on typically a sub-second by sub-second basis. The PhaseNet core software is designed to do the latter and turn lemons (odd random sequences of group's forming and reforming) into lemonade (a highly redundant and data-rich web of useful connections and superb continuity of position solutions and error estimates).

For illustrative purposes, FIG. 6 graphically clears out all other vehicles (which may still be present) and shows three successive instances in time of vehicle A turning from Main Street onto Wall Street, with the time-sequence shown by arrows (see, also note 190 in FIG. 6). Notes 194, 195, and 196 in FIG. 6 point out that, internally to the core software on the device of vehicle A, it has passed through first belonging to three groups, then belonging to five groups for roughly a two or three second period as the car swings through the actual intersection, then back to belonging to three groups once it finds itself on Wall Street. The AlphaDawgs at all five intersections likewise tracked this swift group re-association, where the intersections down main street (apart from Wall) simply lost contact with Vehicle A at some point (or clearly knew they were going to lose contact by monitoring the motion records), the intersections down Wall street all of the sudden made contact with vehicle A and immediately invited it into their local groups and informed others in its group of the new arrival, while the central local group at Wall and Main just kept its normal exchanges going with vehicle A all along.

The operations of the Info Loops and Info Structures, Linq Loops and Linq Structures, and other data loops and data structures, e.g., described in the related disclosures, keep track of these highly dynamic group relationships typically in tenth-of-a-second by tenth-of-a-second harmonic block intervals. Engineering implementations of this situation do not need to necessarily work toward this tenth-of-a-second specification, perhaps preferring a one-second group reformation specification or something even slower, but there seems to be no technical reasons that one-tenth of a second or even faster cannot be specified.

The data loops in charge of producing raw ping data do not necessarily care about group association and re-association dynamics, they just gather and organize raw pings as they send them and hear them. Thus, referring to FIG. 6 and vehicle A at its position on Main Street, that vehicle's ping driver will be dutifully count-stamping all of its outgoing messages (perhaps ten per second), while also count-stamping all incoming messages (typically many dozens if not hundreds per second), whether they are from other nodes in the groups that it currently belongs to (the three intersections along main Street) or from any other nodes whatsoever. The ping driver does not care, it just count-stamps and logs numbers. The ping driver passes these collections of received count-stamps along with the identification (ID) numbers of the senders over to the core processing software. The ping driver's job is over, relative to its role in topographic oozing or topographic dynamics: count-stamp tx events (transmissions) and count-stamp rx events (receipts), log the events and pass the event information along to other nodes.

The solution loops, on the other hand, are kept relatively busy with changing conditions of the H matrices and their inversions. In its most basic and general form, this latter issue of continually needing to re-evaluate the H matrices could in fact get out of hand computationally if we go to hundreds of node extremes. Fortunately, there are a very large set of practical engineering option choices to reign in the "purest" tendencies to completely account for all nodes and all possible local group conditions.

One example of extreme simplification on the H matrix dynamics challenge is to pre-load template matrices which correspond to discrete combinations of how many vehicles are currently down the four directions of the streets, e.g., from 0 to nine vehicles in each direction, giving then ten to the fourth power number of pre-loaded H matrices and their inversions. The inverted matrices themselves can be compressed into the few kilobyte range. Thus, only about a few ten's of megabytes of storage are used to accommodate all possible combinations of up to nine vehicles in every direction. For more than nine cars, according to one embodiment, completely separate sub-groups of the local group are formed at that point, keeping the general overall numbers of the groups to one or two dozen each. There are a great many other such engineering options possible to keep the dynamic H matrix problem a very tame one.

The info loop and the linq loop are also busy during topographic oozing, the linq loops less so than info loop. The linq loops are told by the info loop which linqs are currently active and are part of one or more group associations. The linq loop then monitors the status of each linq, not caring too much whether it belongs to one local group or another. In FIG. 6, vehicle A has been told that the AlphaDawg on Main Street a block and one half ahead is part of at least one local group to which the vehicle belongs, and it has been told that its ID is 46352849. In certain embodiments, vehicle A may not receive more information than this regarding the AlphaDawg. The linq loop then scans incoming count-stamp logs from the ping driver, looking for ID 46352849 (and all other active linqs as well), then when it finds this ID, it goes ahead and performs its tasks as described in the related disclosures. For the purposes of topographic oozing, it flags the info loop that this particular linq remains active at to indicate that the one or more groups to which it is associated remain viable.

It is in the info loop where most of the processing happens relative to the management, as opposed to the number crunching, of topographic oozing. But even here, the tasking is fairly straightforward. A mobile node in particular has been configured to know that part of its normal operation is to ooze through overlapping local groups. One task that it assigns to the linq loop beyond reporting on the health and status of current local group linq members is to always be on the look-out for either unknown sending node ID's on the one hand, or some "expected" list of ID's on the other hand. When the linq loop scans and retrieves a ping from a non-currently-associated linq, it will nevertheless set up a temporary holding structure for that 'possible linq' and report back to the info loop that there is a linq possibly available that is not a current member of its known groups. (Likewise, an "ignore" list can be sent by the info loop to the linq loop, alerting the linq loop that it may every now and then see a certain ID, but to ignore it and move on).

The info loop is the proper place, containing the appropriate set of structures according to certain embodiments, wherein the lists and maintenance of the overlapping group associations is accomplished. Vehicle A in FIG. 6 associates itself with three active groups at an initial time-space point (see note 194), where these associations are maintained with the info loop and info structures. As it approaches the intersection, either the Alphadawg itself at Wall and Main may send a message to the vehicle A that it should expect to start hearing from the two new intersections down Wall Street, or, the linq loop simply starts reporting that it is hearing new linq ID's, which would then kick off normal group association processes once the info loop has been informed of these new linqs and Vehicle A sends out a brief message to the AlphDawgs of these two new groups that it wishes to join the groups. The variations on how the new group association is formed are many, as well as the approaches to take for informing the info loop of Vehicle A that there are new groups to join.

Returning to FIG. 6, AlphaDawg Nodes at the 5 intersections cooperate to determine which local groups that 'Vehicle A' will participate in as it turns from Main Street onto Wall Street, where group-associations can change at Harmonic Block intervals, typically in the tenth-of-a-second range. Harmonic blocks become the group-wide coarse metronome whereby higher level group associations and changing solution conditions are managed. The tenth of a second range is purely rule of thumb, and both slower and faster rates may be needed as a function of application and certainly as a function of expected traffic flow rates. A tenth of a second on a highway setting with 70 MPH cars may in fact be too slow, for example. There is no reason technically to not adapt the harmonic block rate to the particular application.

VII. A Deeper Look at the Operational Forms of "Zulutime"

Figure 7:
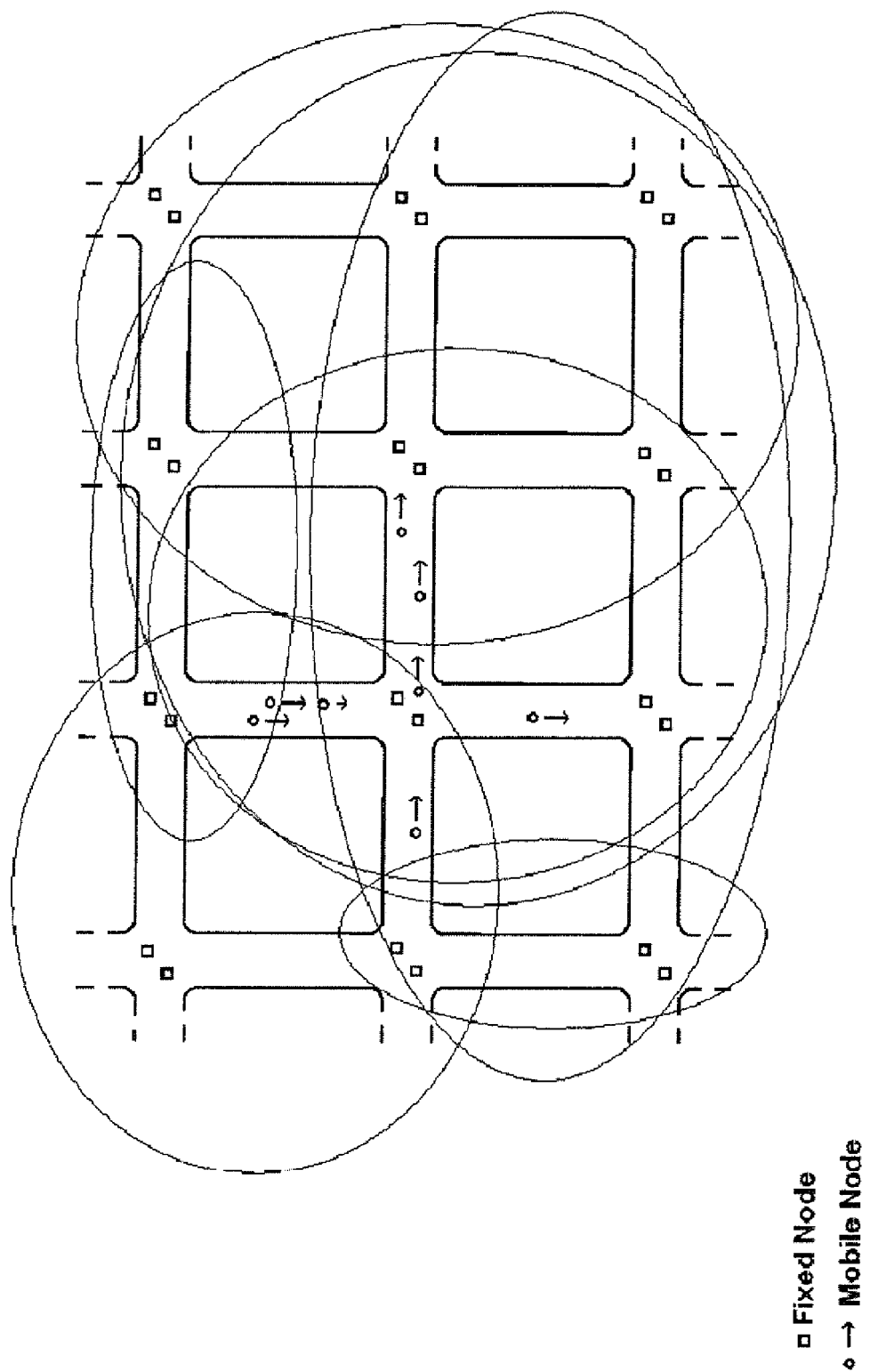
FIG. 7 is a schematic diagram illustrating the concept of Zulutime according to certain embodiments.

FIG. 7 is a schematic diagram illustrating the concept of Zulutime according to certain embodiments. A common question for implementers of this disclosure as well as users is: what is Zulutime and who is defining it? FIG. 7 graphically illustrates that there may well be a large number of overlapping and hierarchical groups all processing respective data, but where does Zulutime come from?

Figure 8:
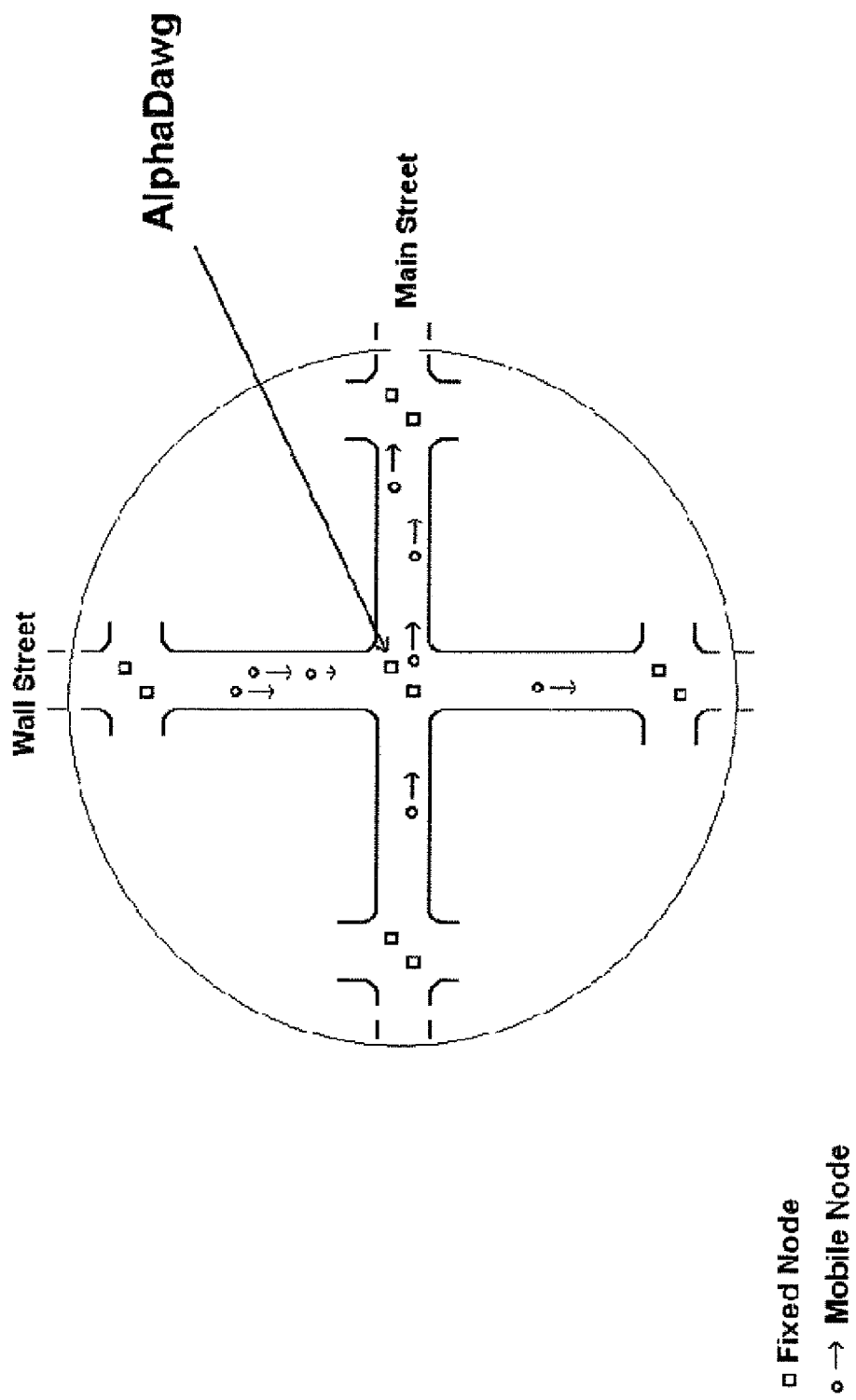
FIG. 8 is a schematic diagram illustrating that each AlphaDawg node is free to choose its own definition of local Zulutime for its local group according to one embodiment.

FIG. 8 is a schematic diagram illustrating that each AlphaDawg node is free to choose its own definition of local Zulutime for its local group according to one embodiment. Each and every AlphaDawg is free to choose its own definition of local Zulutime for its local group. The primary job of local Zulutime is to provide a short-term local time-reference against which all participating clocks can track their deviations. The word "time" itself is a notoriously over-loaded and slippery concept. In the context of a local group functioning to help understand the spatial relationships of group members, then there may be no need to explore the metaphysical and mystical associations of the word "time." Rather, certain embodiments are concerned only with the dynamic and evolving error ellipsoids on the position estimates of group members.

One choice that the AlphaDawg can make is to choose its own counter to represent local Zulutime. For most applications, this turns out to be the most efficient and least complicated from a network programming perspective. Artisans in the global timekeeping community would phrase this as the AlphaDawg's clock becoming the local master clock, but even this statement is an order of magnitude more metaphysical than it needs to be. The AlphaDawg's monotonic counter, replete with resets to zero every half hour or so (for typical consumer-grade counters), may work just fine as local Zulutime. No need to put the raw numbers into dates, hours and minutes, according to certain embodiments, just raw streams of monotonic numbers are all that may be needed from a strictly engineering perspective.

A baseline engineering requirement, explored in much more detail in the related disclosures, is to have multiple exchanges of messages eventually parse out the tangled numeric relationships between a variety of monotonic counters wandering about each other in absolute counting rate, as well as from spatial distance relationships, instrument delay unknowns, multi-path distortions, and the like. Zulutime, in deference and honor to the word's practical use in the aviation world, becomes an arbitrary workhorse standard that allows these numeric relationships to become formulated in quasi-linear equations. Whether one chooses to, or needs to, relate some of these numbers to the concept of time may be immaterial to the functioning of a local group. It is the DZT or delta-Zulutime solutions that become operative parameters in position determinations. The next few figures may slightly over-simplify the situation in an attempt to explain why this works, where the oversimplification is explained in the related disclosures.

Figure 8A:
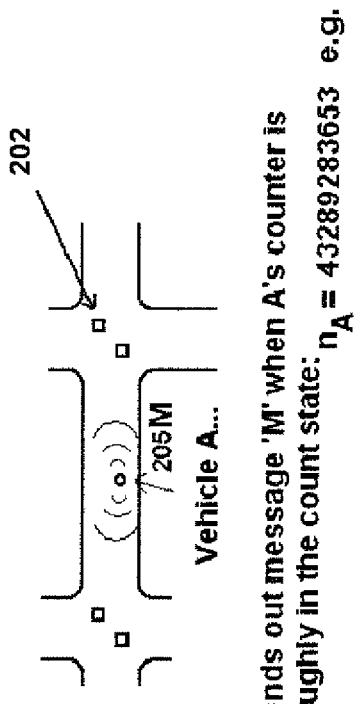
FIG. 8A is a schematic diagram illustrating vehicle A sending out a count-stamped message "M" at some instance according to the example embodiment of FIG. 8.

FIG. 8A is a schematic diagram illustrating vehicle A sending out a count-stamped message "M" at some instance according to the example embodiment of FIG. 8. In this example, the internal counter reads 43289283653. This act of sending the message M is enumerated as reference 205 in FIG. 8A. Note 202 in FIG. 8A also indicates that the local group's AlphaDawg has chosen its own counter for the local group's Zulutime definition. At this first step in the example, the number listed above has nothing to do with whatever numbers are streaming away in the AlphaDawg's counter.

Within FIG. 8A, note the use of the word "roughly" in the statement about the outgoing message. Additionally, AlphaDawg node (202) arbitrarily defines Zulutime as its own highly flawed and metric-less monotonic counter. The general idea here is that the underlying hardware is of normal commercial grade, where generally speaking, steep commoditization pressures virtually guarantee that their quality of performance is only as good as is needed to meet basic communication specifications. A typical value for the count rate of a commercial counter driven by an approximately 50 MHz clock may be about 20 million counts per second. This produces a discrete count increment every 50 nanoseconds, roughly. Typical specifications on the allowed different absolute rates between clocks on, for example, two 802.11 communication devices is on the order of 25 parts-per-million (PPM). A simple way to run the math here is that one device might be producing 20 million discrete numbers per second, while another device of the same make and model right next to it is producing 20,000,500 discrete numbers per second.

These general kinds of numbers are used in this example, noting that these raw numbers are effectively all over the place.

Figure 8B:
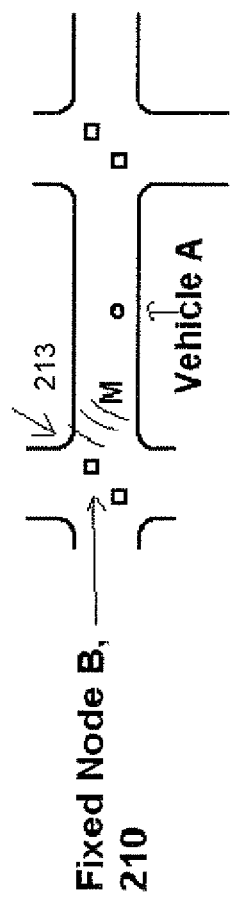
FIG. 8B is a schematic diagram illustrating a situation where some random separate node B hears message M sent out by vehicle A according to the example embodiment of FIG. 8.

FIG. 8B is a schematic diagram illustrating a situation where some random separate node B 210 hears message M sent out by vehicle A according to the example embodiment of FIG. 8. All the other nodes in Vehicle A's linq list may also hear this particular message M, where FIG. 8B arbitrarily chooses a fixed node 210 as an example receiver. Node B receives message 'M' sent from Vehicle A earlier, and its counter is roughly in the discrete state: e.g., $n_B$=3347110198766. Therefore, message M was "roughly" received at the local counter value of 3347110198766. This number is quite different from the local counter at A when message M was sent. Note also that both FIGS. 8A and 8B have not yet referenced local Zulutime, or the counter values at the AlphaDawg.

One of the end goals of this disclosure is to nevertheless produce a useful distance or range estimate between vehicle A and fixed node B based on this single passing of message M. To put this in engineering-terms: What kind of network layer software and what form of network communications protocols need to be built in order for message M to immediately produce a range estimate between A and B?

The related disclosures go into additional details of the software structures and communications protocols involved, but the next set of figures attempt to intuitively summarize how this single-message ranging can be achieved.

Figure 8C:
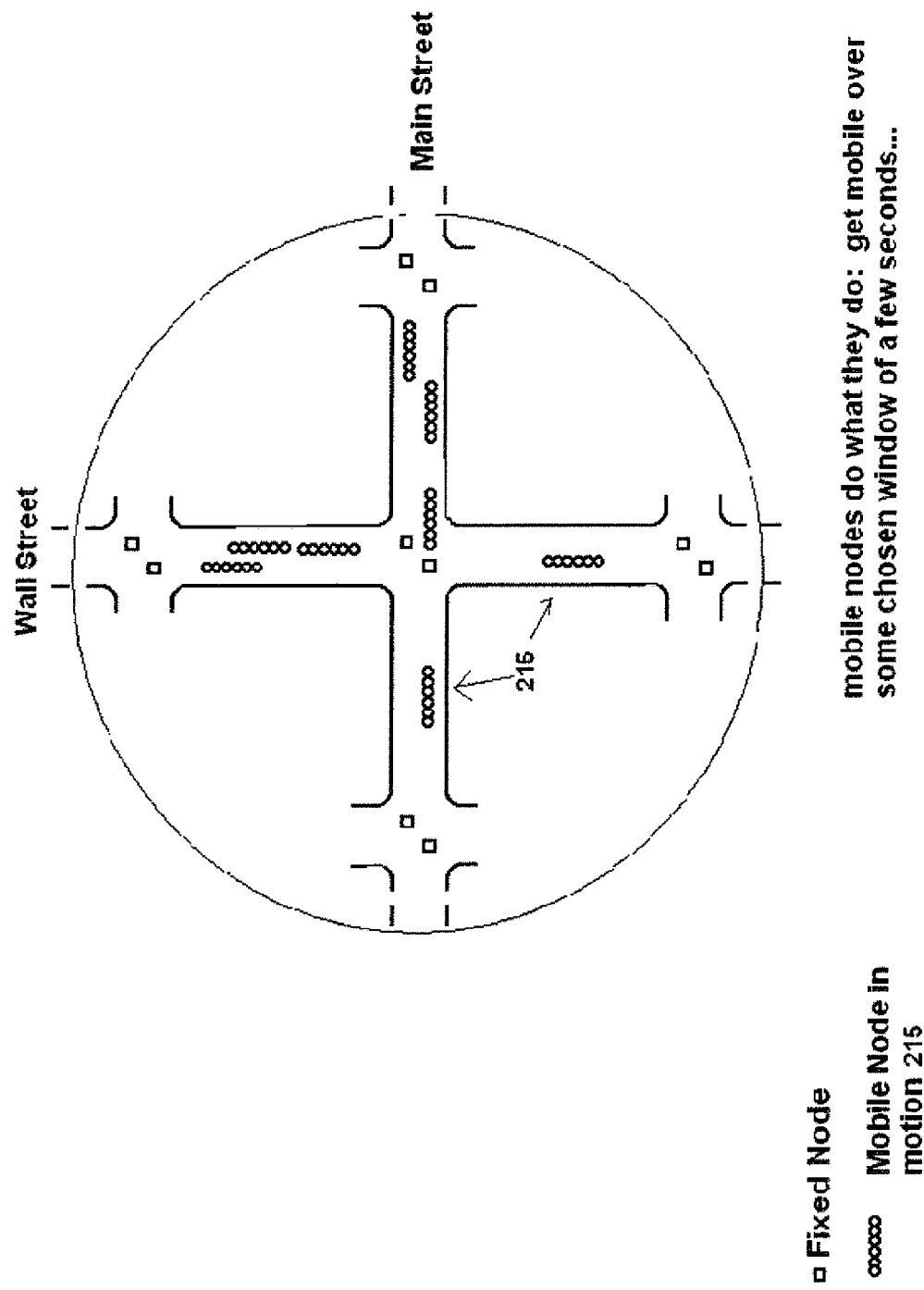
FIG. 8C is a schematic diagram illustrating respective vehicles in motion according to the example embodiment of FIG. 8.

FIG. 8C is a schematic diagram illustrating (with a connected series of circles) respective vehicles in motion 215 according to the example embodiment of FIG. 8. For example, these vehicles 215 may be travelling about 30 miles per hour or some other speed, with brief instances of their positions depicted (by the connected series of circles).

Figure 8D:
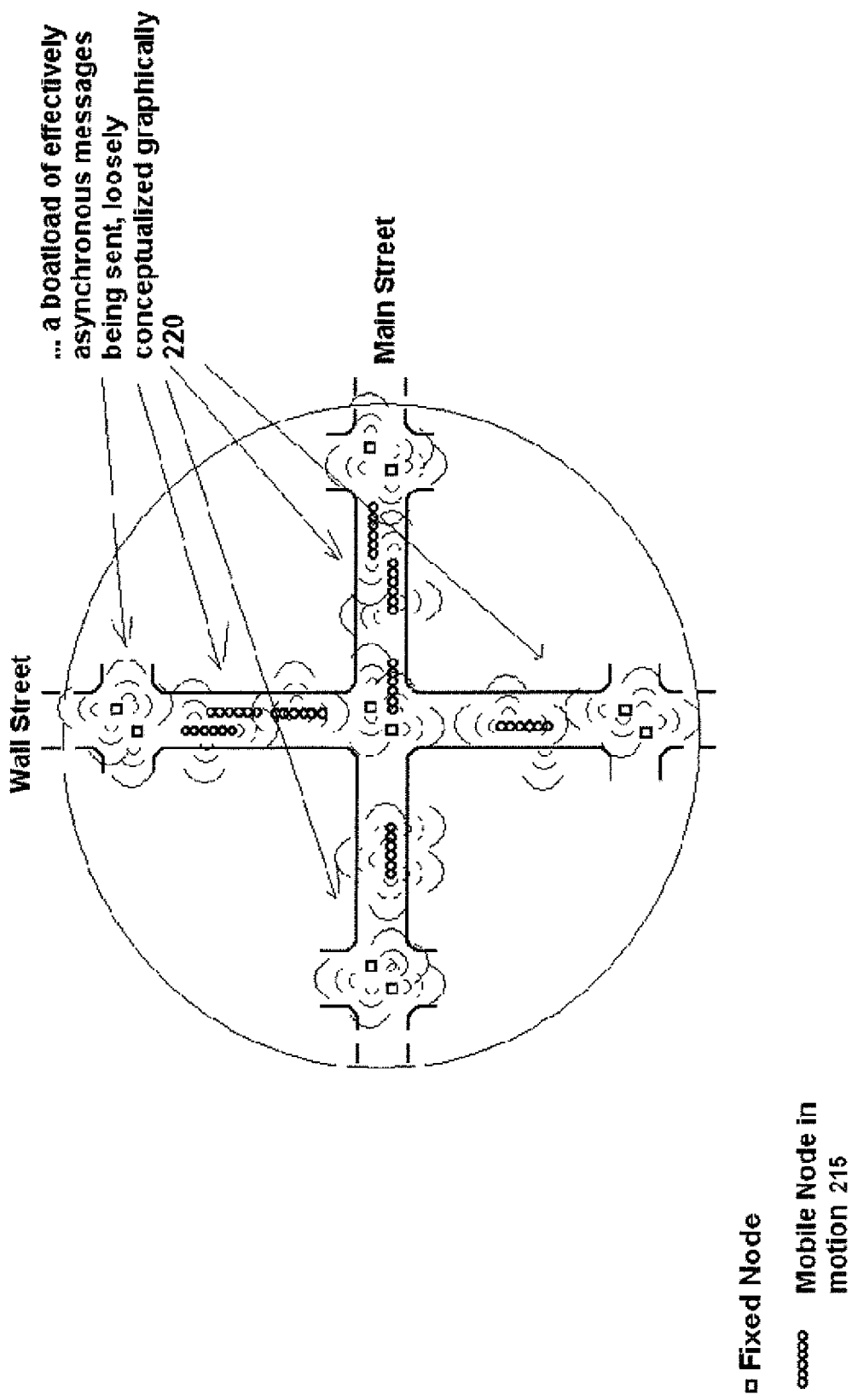
FIG. 8D is a schematic diagram illustrating a moment in time a few seconds before message M is sent out by vehicle A, as shown in FIG. 8A.

FIG. 8D is a schematic diagram illustrating a moment in time a few seconds before message M is sent out by vehicle A, as shown in FIG. 8A. Typically, dozens and dozens of messages have been sent out by every node in the few seconds before message 'M' was sent out from Vehicle A, as depicted in a previous figure. Note 220 in FIG. 8D indicates that over a few seconds time before message M is sent, all nodes in the local group are busy sending out their own messages, where FIG. 8D just displays a sampling of these previous sent messages. The basic point is that all nodes are constantly sending out messages, where for certain example embodiments, at least ten transmitted messages per node is recommended. However, even down to only one transmitted message per second (or fewer still) can be usable.

Figure 8E:
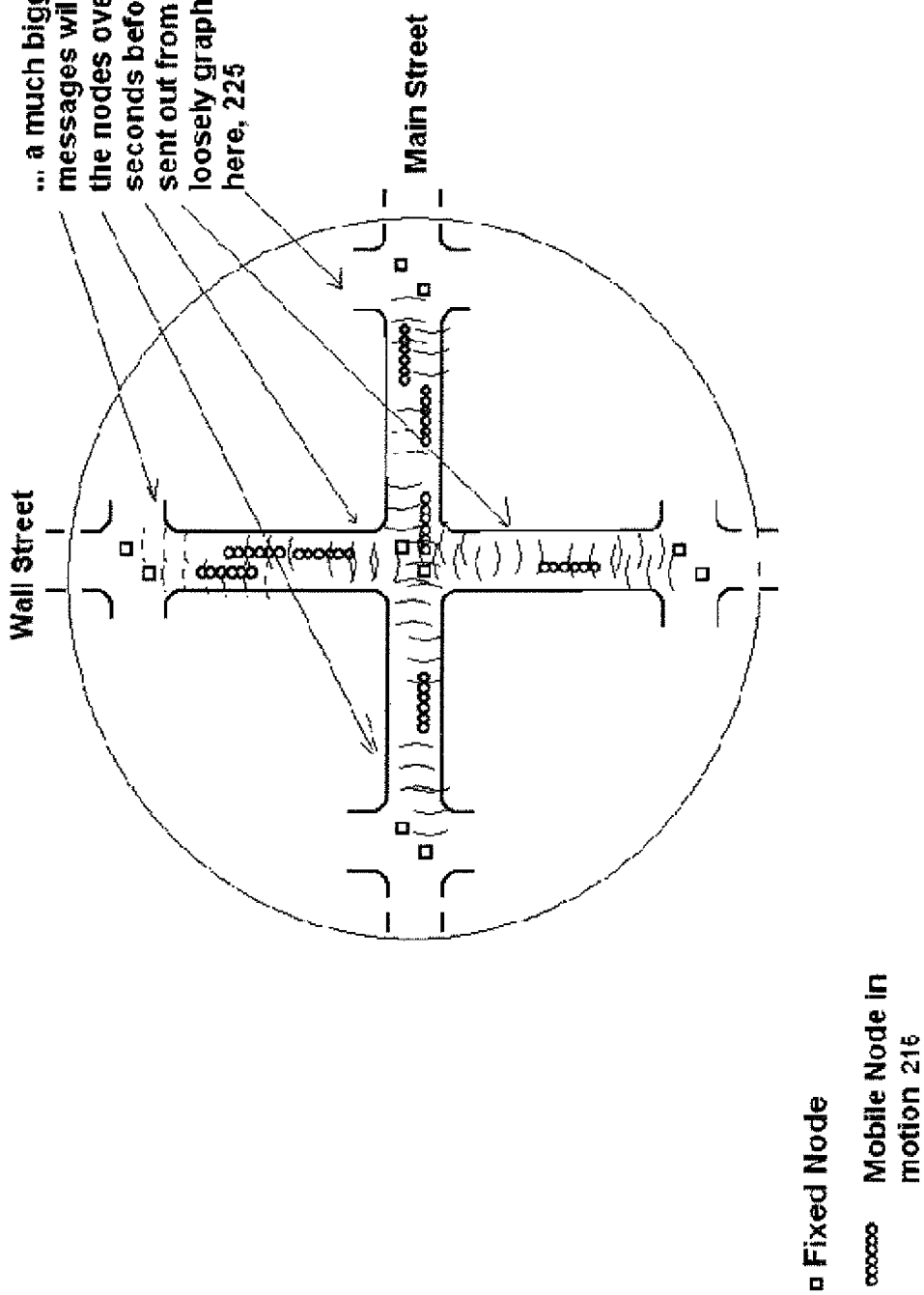
FIG. 8E is a schematic diagram illustrating that all the nodes in the local group are likewise receiving messages all the time according to the example embodiment of FIG. 8.

FIG. 8E is a schematic diagram illustrating that all the nodes in the local group are likewise receiving messages all the time according to the example embodiment of FIG. 8. A singular message from any node is usually heard and Ping-driver count-stamped by many other nodes, possibly all other nodes in a local group; hence, the bigger quantity of RX countstamps over TX countstamps, generally speaking. Note 225 in FIG. 8E also points out that generally speaking there may be a much larger overall number of received messages than transmitted messages simply due to "sent by one, received by many" principles of networked communications. With reference to FIG. 8E, and as discussed above, any given node may not need to be in active packet-based communication with another node for a ping-event to be recorded. In the case of FIG. 8E, some random vehicle may be sending a data packet to some other random fixed node, such as the AlphaDawg at Wall and Main, but all other nodes can be listening to that packet exchange and simply extracting their own ping event local count stamp of the message, while not bothering to decode the sent message. This situation may be very common in practice.

Figure 8F:
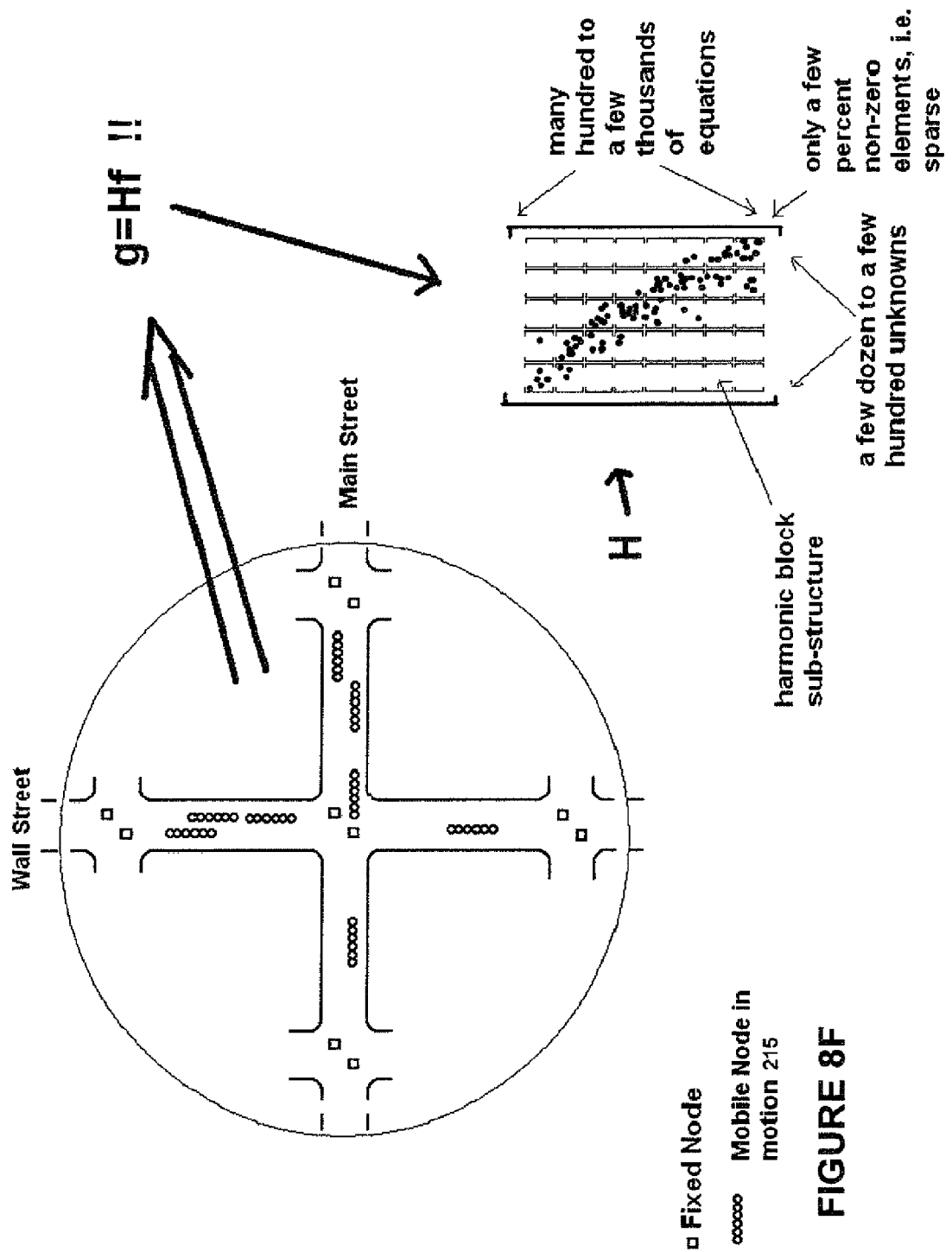
FIG. 8F is a schematic diagram illustrating a large number of messages sent and received by nodes in the local group and organized into linear equations according to the example embodiment of FIG. 8.

FIG. 8F is a schematic diagram illustrating a large number of messages sent and received by nodes in the local group and organized into linear equations according to the example embodiment of FIG. 8. FIG. 8F is an involved graphic that attempts to summarize a fairly complicated situation described in detail in the related disclosures. The general idea attempted to be depicted is that this "large boatload" of messages that have been sent and received by all these nodes in the local group can be organized into a few seconds worth of linear equations with often thousands of equations, i.e., singular data points, and a smaller amount of group unknowns (which will be described in the figures below).

FIG. 8F includes the general g=Hf linear algebraic formalism described in the related disclosures. Here, 'g' is a raw data vector, which in practice is often the difference between a sending node's count value when it sent a message and a receiving node's count value when it received that message (this may seem counter-intuitive, since they are so unrelated to each other, but their unknown relationship is precisely one of the primary unknowns we are seeking). H is a snapshot linear relationship between nodes: their spatial positions, their count-stamp differences, and a variety of what can be called nuisance variables. And 'f' is the unknowns in the local group, dominated by countstamp differences and spatial relationships.

A single row in the H matrix represents a single data point, most often representing a single node's ping-receipt. The non-zero elements of the H matrix rows are abstractly represented in FIG. 8F, where the artistic license here is aimed at illustrating the completely sporadic nature of communications as opposed to some assumptions being made about data points being collected with imposed regularity. FIG. 8F notes that typical operational H matrix formulations may include hundreds if not thousands of single data point equations. FIG. 8F also notes that most elements in the matrix are zero, i.e., the H matrix is typically sparse. This sparseness may be a practical issue on many engineering levels, not least of which is during common optimizations where the strict H matrix formulation is replaced by a linearly equivalent Kalman filter formulation, where the sparseness of H generally translates into what for many intents and purposes becomes what many industries refer to as a time-domain linear filter. A mass implemented example embodiment of this disclosure would gravitate toward this Kalman formulation approach, while the full H matrix approach serves better for early overall framework explanations. Note also that rows of the H matrix can also contain various "a priori knowns" in a system of equations, such as certain spatial constraints on node positions for example, or some external knowledge of clock relationships that separate equipment may be reporting.

The columns of H represent locations of specific unknown parameters, as will be further described in summary below and which are also described in the related disclosures. FIG. 8F notes that typically there are a few dozen to sometimes into a few hundred unknowns in a system with say five to fifteen node participants. These numbers are simply practical guidelines for implementation as opposed to representing limitations.

Also highlighted in FIG. 8F is an array of finer brackets, labeled "harmonic block sub-structure." The related disclosures go to great lengths explaining the role of harmonic blocks or their equivalent forms. In short, harmonic blocks represent the interface between the strict regularity and uniformity that high level software and network processes like to work with on the one side, and the arbitrary sporadicness of nodes coming and going in a local group and their equally sporadic communications. The interface also includes providing a structure to contain and accommodate a wide variety of time-based processes that are different from each other, where for example the time-based characteristics of one node's clock relative to another has quite different properties from an aircraft's positional movement in heavy turbulence. Yet a general processing framework is used to relate the two phenomena, where an example embodiment of this disclosure has chosen to do so with these harmonic blocks. The physical-time length of a typical harmonic block is a function of the particular application, where for intelligent transportation applications a value of one-tenth of one second is not unreasonable. As a vehicle moves through city streets, it and its local groups may be assessing their group relationships generally at this harmonic block rate. In Kalman optimizations, the harmonic block rate may become a guide toward the setting of parametric rates for various underlying unknown parameters being solved for as well.

Figure 8G:
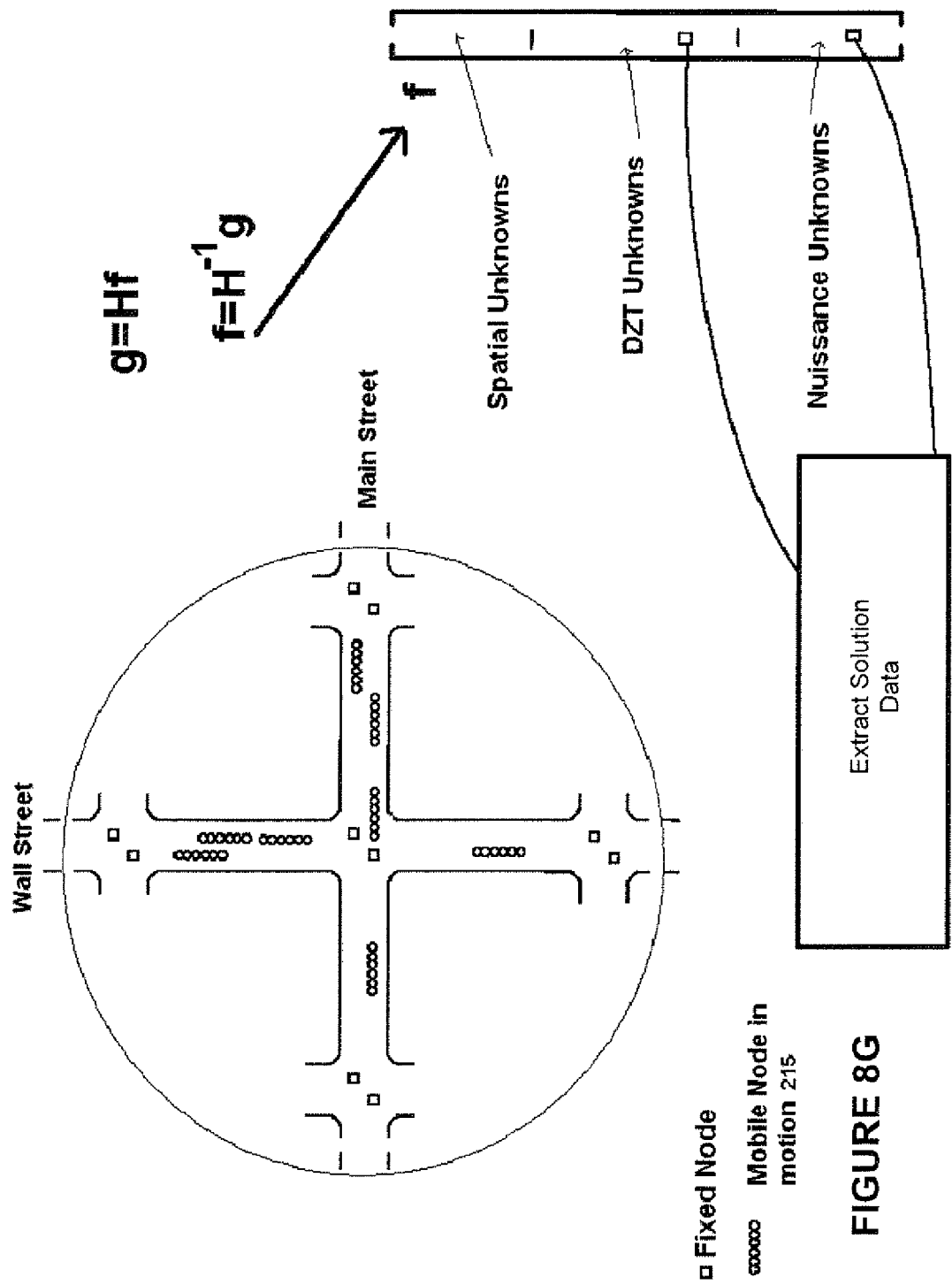
FIG. 8G is a schematic diagram illustrating the solution vector f according to the example embodiment of FIG. 8.

FIG. 8G is a schematic diagram illustrating the solution vector, 'f' according to the example embodiment of FIG. 8. This vector may include component solutions for most if not all nodes in a local group. The categories of these solutions are conveniently split out into the three buckets or groups indicated in FIG. 8G: spatial unknowns, DZT unknowns, and nuisance unknowns. It is not an unfair summary to say that most applications are seeking the first category through the primary mechanism of the second category, while being plagued by the engineering challenges of the third category.

The spatial unknown solutions are most generically in terms of motion parameters as opposed to absolute positions. One of the main reasons for this is that two and three dimensional absolute position unknowns inherently bring with them non-linear attributes such as the square root of the sum of squares in direct ranging representations of a single data point measurement. For the specific application of vehicles travelling on roadways, however, there are new tools that can be employed that utilize known constraints of vehicle traffic in order to pseudo-linearize absolute position unknowns. For example, knowing that a vehicle is generally in the middle of the block on Main Street, which might itself be a one way street, then initial linear g=Hf formulations might isolate the "x-axis" parameter (the axis coincident with Main street) as the directly solved entity. One point to be made here is that there is vast flexibility in choosing approaches to approximate solutions, initial solutions, post-solution refinements, and the like. All of these solutions broadly fit into the sought-for spatial solution that intelligent transportation systems are seeking.

The middle bucket or group in FIG. 8G labeled 'DZT unknowns' are Delta-ZuluTime unknowns, representing the unknown relationship between any node's local counter and the local group's particular definition of Zulutime, whereas previously stated this is often just the AlphaDawg's own counter. By solving for DZT's, a given node can know to within some margin of error what the AlphaDawg's counter is reading at any given tick-value of its own counter. Later figures show how this is used.

The third bucket or group of unknowns in FIG. 8G is labeled "nuisance unknowns," partly in homage to the classic use of the word "nuisance variables" in GPS and other fields. Broadly speaking, this includes all unknown parameters that simply are not either spatial in nature or related to counters and clocks. The related disclosures highlight two typical examples of these unknowns, one being instrument delay properties and the other being environmental effects such as multipath. In both of these cases and others, it is often possible to treat these nuisances as explicit unknowns in the general rolling up of network-node relationships, thereby explicitly attempting to measure them and through their measurement either partially or nearly fully mitigate their negative effects on the qualities of solutions. FIG. 8G thus summarizes their common participation in solution formation.

Another note about FIG. 8G is that the text inside the graphic (Extract Solution Data) along with the lines attempt to present the notion that later stages of processing, described in some ensuing figures and accompanying text, extract certain specific information from these initial solutions. This process extracts the necessary solution data to help frame message M's inherent ranging relationship between Vehicle A and Fixed Node B.

Figure 8H:
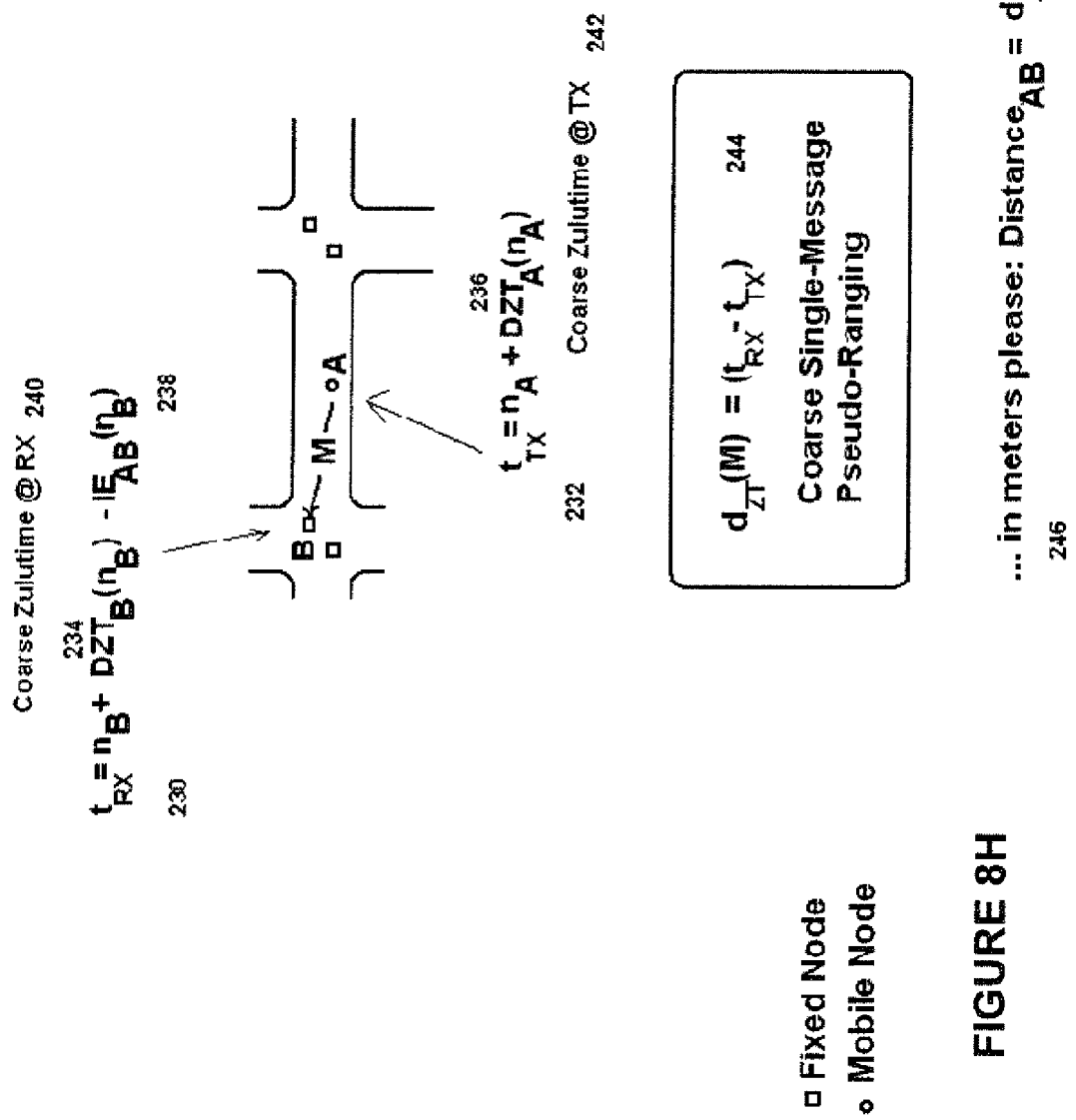
FIG. 8H is a schematic diagram illustrating a culmination of the previous steps according to the example embodiment of FIG. 8.

FIG. 8H is a schematic diagram illustrating a culmination of the previous steps according to the example embodiment of FIG. 8. FIG. 8H shows how the relatively short set of network traffic immediately prior to the sending of message M can produce specific estimated variables which can then frame message M as a classic discrete ranging instance. The details of FIG. 8H are ultimately a slight over-simplification in practical terms, because these discrete ranging measurements are rarely explicitly made, and their effective presence are either represented as rows in H matrices or as parametric sequences in Kalman filters. But, FIG. 8H provides valuable insight for the present disclosure.

Indeed, there may be no reason whatsoever that certain embodiments should not choose to implement this explicit and clear form of the disclosure. From ease of programming standpoints as well as the training of engineers, this approach does have distinct merits. A caution, however, would be to bear in mind that the underlying unknowns are both linearly and to some degree non-linearly mixed, and better ultimate results may be had by following the more general combined solution approaches rather than forcing them into the form shown in FIG. 8H. Likewise, for lay-technical explanations of the fundamentals of how the embodiment works, something similar to FIG. 8H is often utilized. For non-experts, it grounds the audience in a classic "ranging" mindset.

In FIG. 8H, a single estimate for distance between A and B is shown within the rounded rectangle 244. The units of this raw ranging measurement are in ZT tick distance units, so the note 246 below the rounded rectangle 244 makes the explicit conversion to meters.

The components of FIG. 8H include the notional "local Zulutime" (labeled 230 or $t_{RX}$) wherein message M was received by node B, and the notional "local Zulutime" (labeled 232 or $t_{TX}$) that the same message was sent by node A. In one sense, this is a node's best estimate of what the AlphaDawg's counter would be reading precisely when the message was received and sent, respectively. There is no need, in certain embodiments, for any of the underlying clocks to be "steered" (as the art of timekeeping puts it) to local Zulutime, because the calculations or number crunching simply continually produces these correction factors. Note that the use of the letter 't' (e.g., $t_{Rx}$ and $t_{TX}$) is ultimately just a unitless counter value, and should not be confused with an actual time.

The two n's sub-scripted by B and A in FIG. 8H respectively are the raw local count-stamp values of the two nodes.

The DZT values, labeled 234 and 236, are the values that were summarized by the previous sequence of figures and text. Again, DZT stands for delta-Zulutime and represents a given node's best estimate of how far off it is from local group-wide Zulutime at the coarse time that it sent or received message M. It is the set of communications that does the estimating here, not just the node itself, but the node is free to choose exactly how this is calculated and/or filtered. Likewise, other nodes are free to choose how they calculate, filter, or otherwise accept the data of other nodes for what the other nodes' DZT values are. Flexibility in how nodes, especially the AlphaDawg node, calculate these variables, and how they choose to either use or ignore information, is useful to the robustness of the network and of the solutions.

Further, the term 'IE' is represented only on the receiving node B, labeled by 238 in FIG. 8H. This term stands for "instrument/environment" and is used here to simplify the graphic and keep the formula tight. It is represented only on the receiving side, even though in practice delays such as transmit delays (the physical time it takes between when a counter latches to some new value and the time that physical electromagnetic wave actually emits from an antenna) are also present. For many applications, most or all of these delays can be lumped into a receive-side correction factor. Fine-tuned applications may wish to break out transmit-side instrument and environmental delay sources, especially if extra information is available to assist in their measurement.

Note 240 in FIG. 8H reiterates that one can conceptualize $t_{RX}$ as being roughly the counter value of the AlphaDawg (which has been arbitrarily chosen as local Zulutime) when node B received message M. This in practice may be a fractional value rather than an integer, since the calculation of its components are generally floating point values. The note 240 indicates this through the word "coarse," since there are several layers of estimation, along with node B's discrete counter nature, which make this a somewhat noisy estimate in practice. Generating many of these estimates with many messages passed may become a method to smooth out this noise, as is well known by those practiced in the art. Note 242 in FIG. 8H refers to the same general notion as note 240, only for the transmit node A and its instance of transmitting message M.

The result is the formula in the rounded box 244, a very simple result in the units of local Zulutime tick units. This is readily converted to meters as indicated below the box in note 246.

One aspect of FIG. 8H, perhaps not readily apparent but instructive as to how the embodiment functions, is that the set of communications immediately prior to the sending of message A, that produced the DZT estimates as well as the IE estimate, does not need to contain any communications between node A and node B. In other words, message M may be the very first signal exchanged between node A and node B, and yet the overall network can allow that singular message to produce a clear range estimate between node A and B. There are a long list of differences between this disclosure and the prior art as known by the inventors at the time of writing this disclosure, but this aspect of being able to generate a ranging estimate from a first signal between two nodes in and amongst a sporadic and asynchronous set of messages in a network tends to stick out as a very clear difference.

Figure 8I:
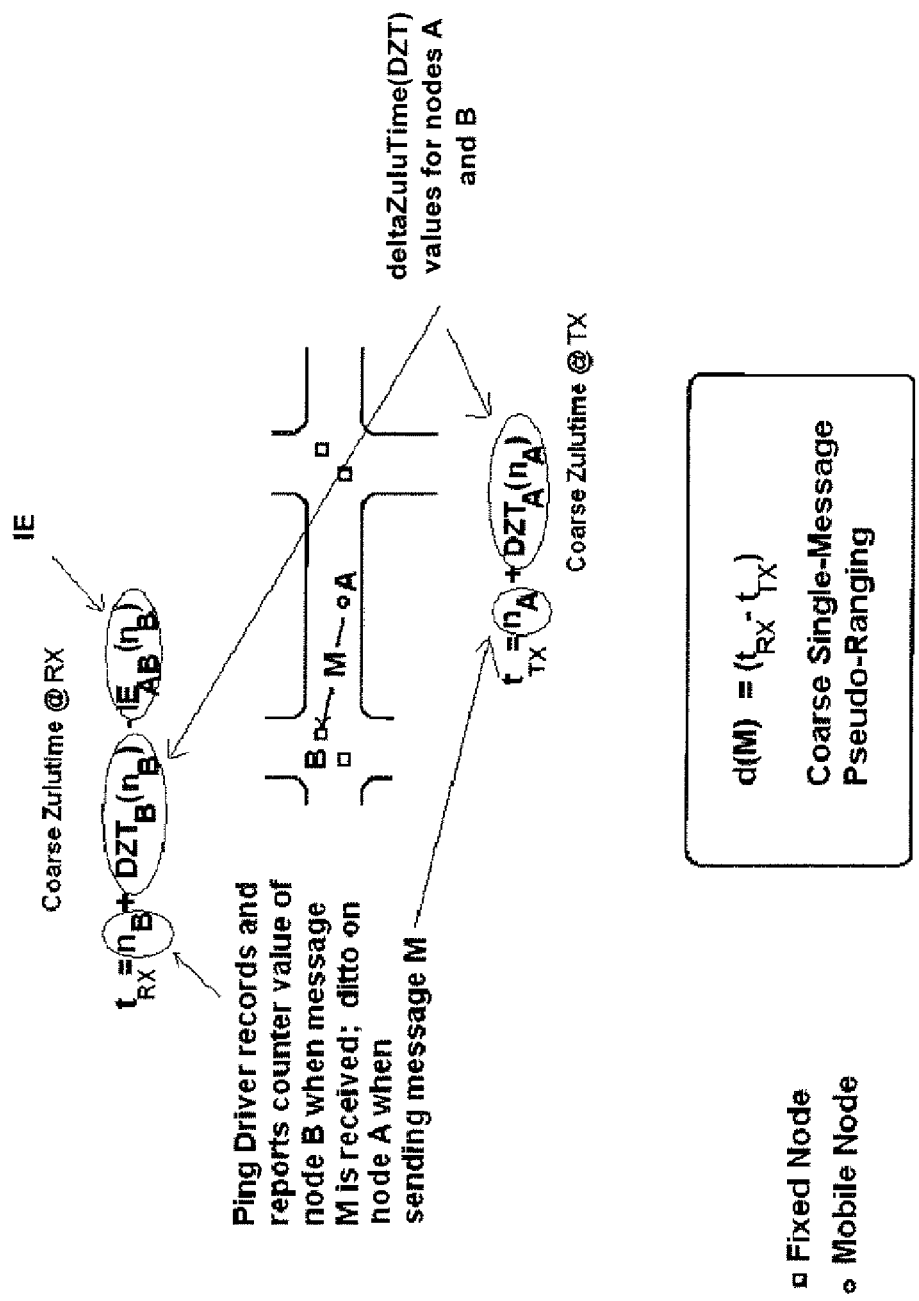
FIG. 8I is a schematic diagram illustrating a summary of the example embodiment of FIG. 8.

FIG. 8I is a schematic diagram illustrating a summary of the example embodiment of FIG. 8. FIG. 8I points out variables and provides some quick notations. One note in particular points out that previous messages between A and B help to form better estimates of the DZT values, while the above discussion pointed out that this is not necessary. It is simply helpful to more robust and more precise results. IE is short for Instrument/Environment nuisance variables such as both A and B's instrument errors and delays, multipath effects, atmospheric delays in longer range communications, etc. Companion disclosures explain why all of these nuisances can roll up into a single correction term on the receiving node's Zulutime estimate. Immediate-past 'random' sets of messages between nodes in the local group, including messages to and from A and B, have estimated A's and B's unique delta-Zulutime (DZT) values, coarsely indexed by their counter values. The word 'coarse' is used quite a bit, alluding to the idea that existing commercial-grade oscillators and discrete counters, along with generally non-trivial nuisance variables, combine to give error bars on individual message-ranging estimates typically one to two orders of magnitude worse than Kalman-filtered final estimates produced after hundreds and thousands of exchanged messages.

Those individuals practiced in the art of GPS positioning well understand that where a single range estimation technique exists, a full Kalman-filtered positioning system soon follows. That is to say, once a set of ranging measurements are put together over some relatively short period of time, such as dozens of estimates over a few tenths of one second, per node, then an accurate fix of position becomes readily available, usually with fairly straightforward dilution of precision estimations (errors in position estimates). The topic of multipath in particular is notable in urban environments and inside buildings, where the formula in FIG. 8I includes a correction factor for this effect built in to the singular ranging estimate value. The raw quality of this multipath estimation becomes an operational issue of course, where a separate related disclosure is dedicated to this fascinating area.

VIII. Emplacement and GPS Extension

Figure 9:
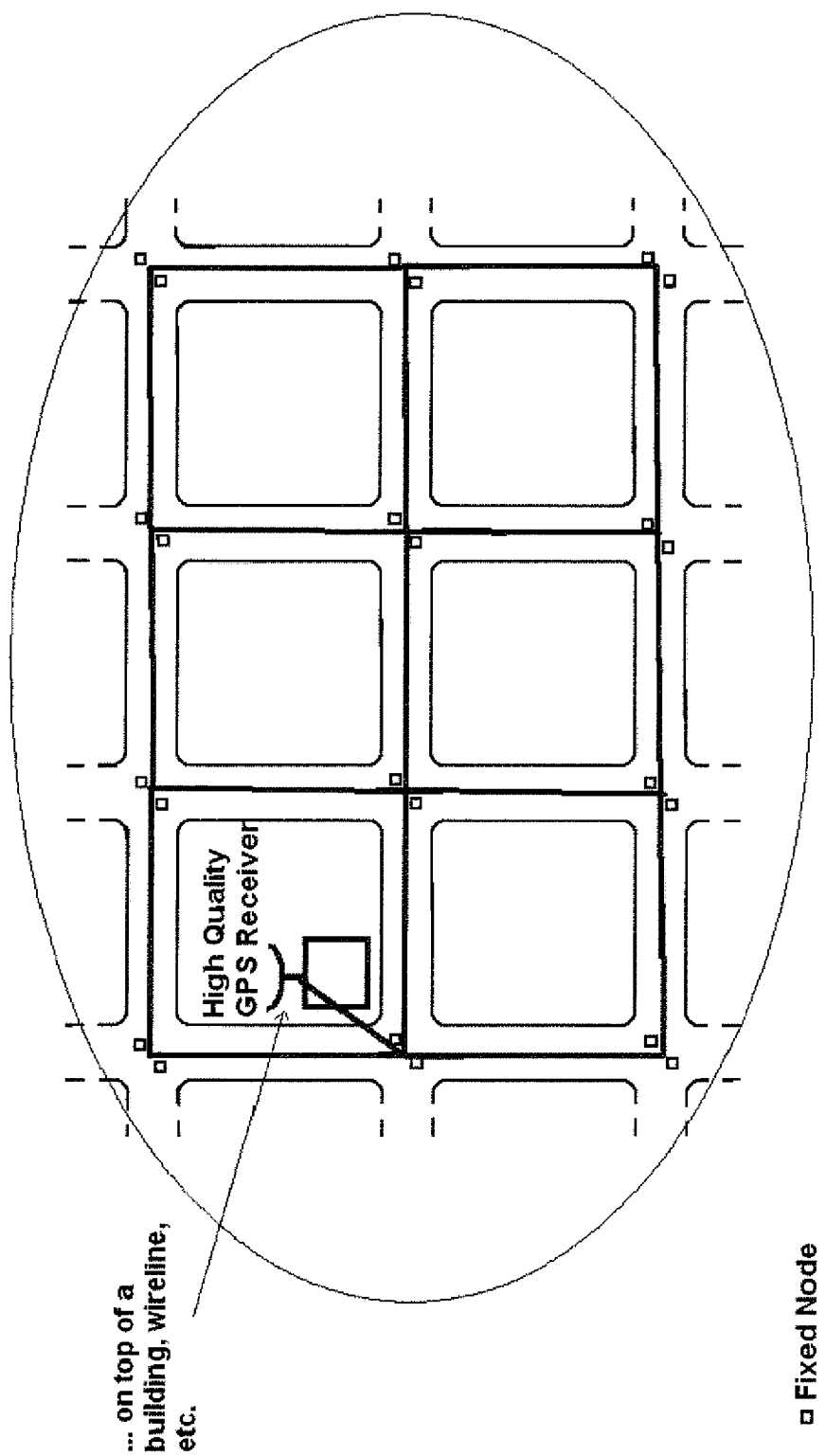
FIG. 9 is a schematic diagram illustrating use of a GPS receiver to maintain a link to global time standards according to one embodiment.

FIG. 9 is a schematic diagram illustrating use of a GPS receiver to maintain a link to global time standards according to one embodiment. An optional "Good Housekeeping" approach is to create regional fixed-node groups, with at least one node communicating with a high quality GPS receiver to maintain a link to global time standards. FIG. 9 introduces an ancillary but nevertheless practical extension of this disclosure. It is ancillary in the sense that it is un-needed from a pure engineering level, relative to the functionality heretofore described. But it is interesting from a broader system integration standpoint, for the simple reason that the world and most of its devices do like to know "what time it is." This simple cultural notion can quickly be technically translated into finding ways (among a wide variety of choices) to instill and diffuse GPS time into any given network. This is essentially the same thing as trying to either gently steer network timekeeping to GPS time and/or coordinated universal time (UTC), or to at least keep track of the differences between network time and GPS time.

One option illustrated in FIG. 9 is to put a high quality GPS receiver on some rooftop somewhere and either wireline its signal to one or more nodes in the network, or alternatively, set up a node in the network right at the GPS receiver and have that node become a super-AlphDawg node within a local group that it defines, which may include a few fixed node members at the few intersections around the building where it is placed. The local counter of the node at the GPS receiver may still simply count away in unitless increments, while standard off-the-shelf timing circuitry may relate the count values or otherwise slave the count values to the GPS time being calculated by the GPS receiver. In this way, the GPS-based AlphaDawg's counting then is directly referenced to at least that GPS receiver's version of GPS time. In FIG. 9, the dark lines drawn along the streets represent, accordingly, the diffusion of GPS time through the network since another figure already showed how intersection fixed nodes become cross-associated, and that this cross-association can be used to relate one AlphaDawg's counting to the next AlphaDawg's counting, all the way out to any periphery from the GPS-based AlphaDawg. There may be a price to be paid in a slight degradation of relating "true" GPS time of a given Node to the same time which would be read as if a high precision GPS receiver were placed at every single node, but for the practical purposes of intelligent transport systems where it has already been pointed out that this infusion of GPS is ancillary in the first place, this creep in timing error is negligible.

Figure 9A:
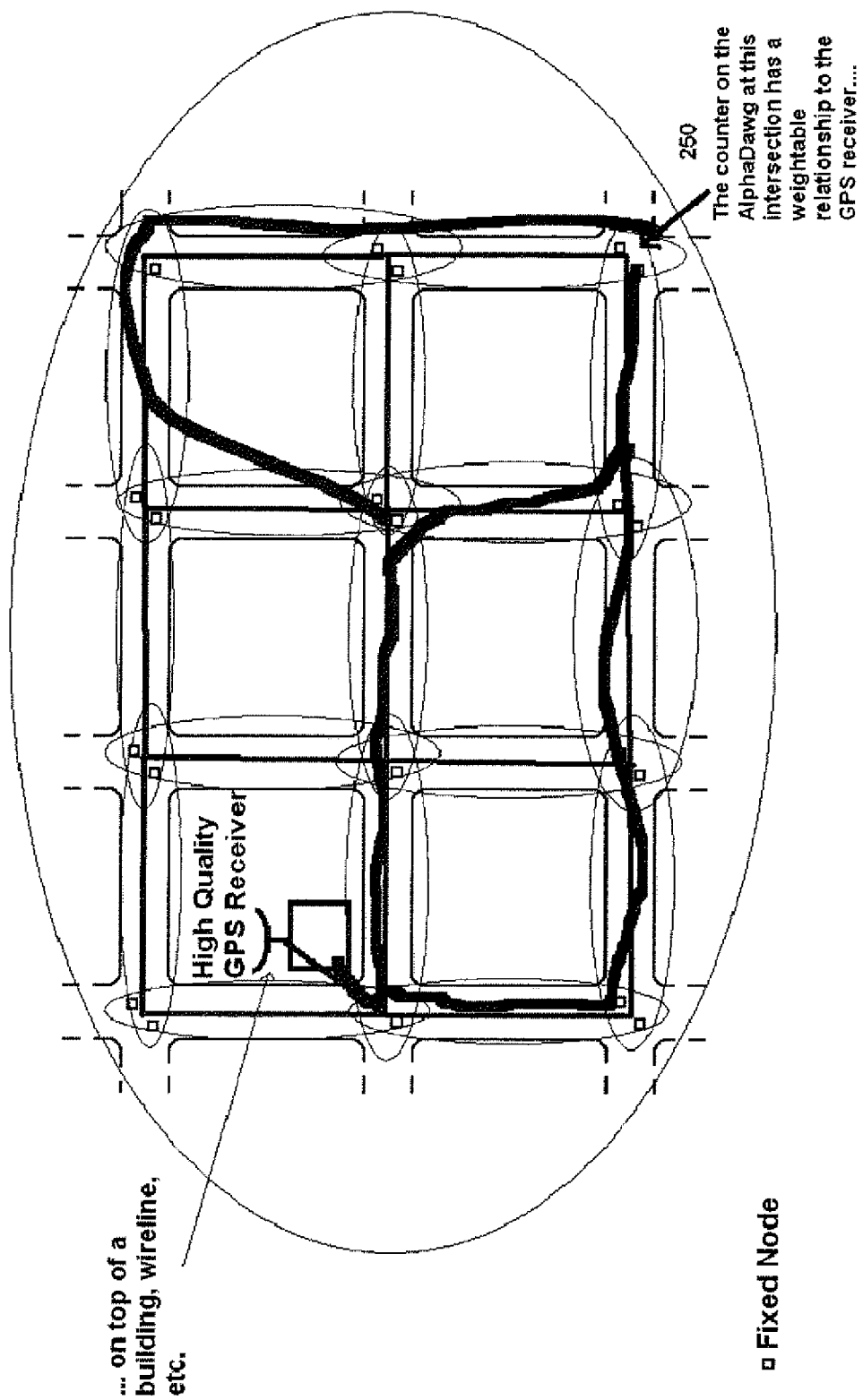
FIG. 9A is a schematic diagram illustrating diffusion of GPS time as a function of cross-group memberships according to the embodiment of FIG. 9.

FIG. 9A is a schematic diagram illustrating diffusion of GPS time as a function of cross-group memberships according to the embodiment of FIG. 9. FIG. 9A depicts cross-group diffusion of GPS time or any other chosen standard time, paving way for city-wide specifications on network time and its quantifiable deviations from broader standards. The related disclosures provide more details on precisely how one local Zulutime can relate to another local Zulutime, but the basic notion is rather simple: an AlphaDawg defining one local group is nevertheless a standard non-AlphaDawg in another group, and hence its DZT value relative to the neighboring AlphaDawg is thus ongoingly calculated. Through chains of these relationships, any given node "5 hops" away from a high quality GPS receiver can still gain benefit from that receiver's time whilst accumulating the associated errors on cross-group DZT errors. Even the "hops" in question are virtual, and hence a given node can relate to GPS time through any combination of hops, including a weighted combination of all hops. This is represented in FIG. 9A as the thick pathlines between a given indicated node (see note 250) and the GPS receiver. At some given instant in physical time, this node counts out a certain value on its counter; it knows that it is X off from its neighbor, which is Y off from its neighbor, which is Z off from its neighbor, which is Q off from the GPS receiver's UTC estimated time. The far node, e.g., indicated by the arrow near note 250, can choose to weight several such paths, in order to slightly refine its own estimate of GPS/UTC time.

Figure 9B:
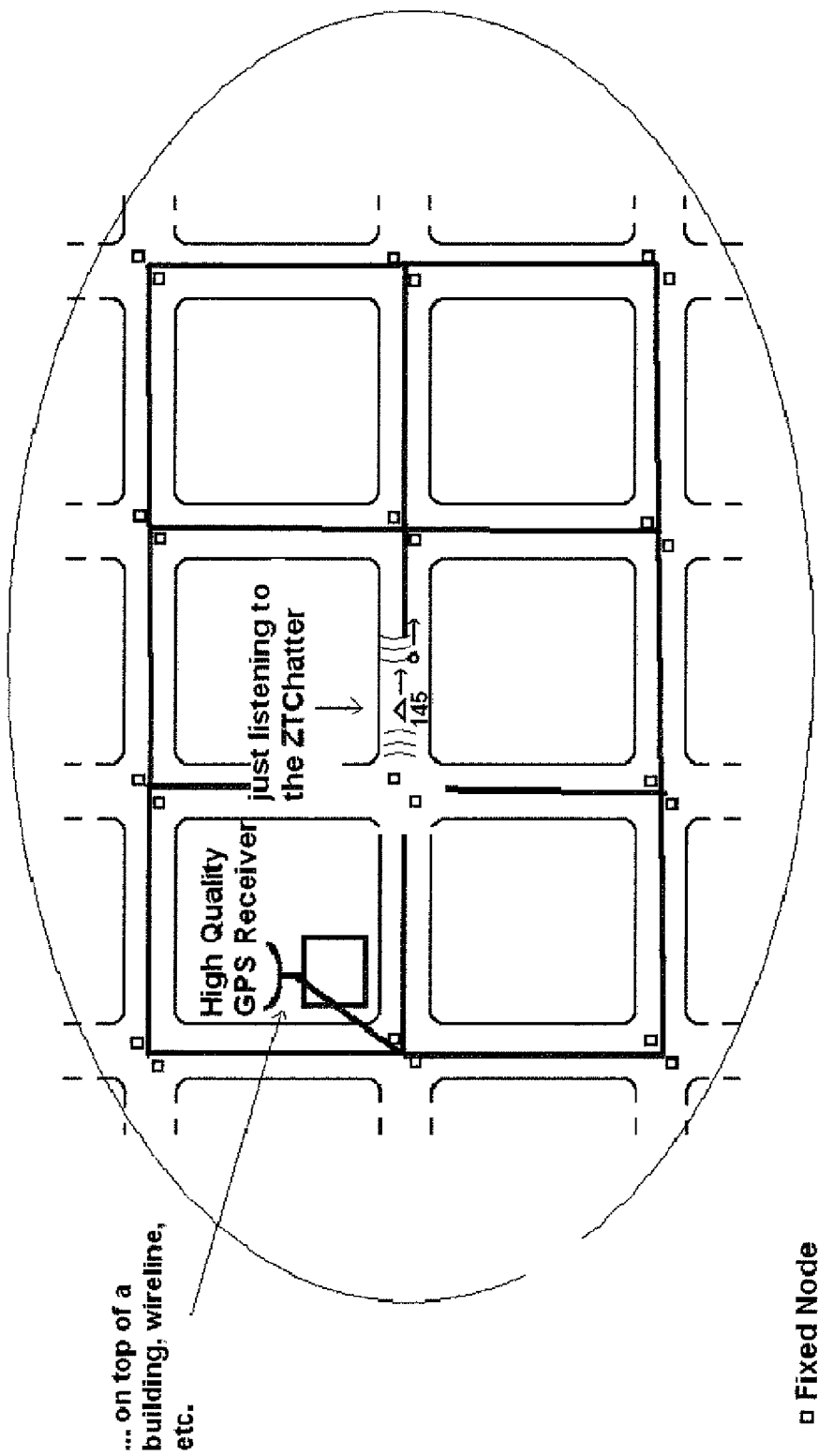
FIG. 9B is a schematic diagram illustrating the receive only mode shown in FIG. 4A according to the embodiment of FIG. 9.

FIG. 9B is a schematic diagram illustrating the receive only mode shown in FIG. 4A according to the embodiment of FIG. 9. FIG. 9B depicts an example of a region-wide GPS Pseudolite-like broadcasting network: The Rx-only mode for mobile clients is clearly possible in such an arrangement. The earlier Rx-only client is pasted into this figure. As discussed above, a network may be used whereby client nodes need only receive signals, just like GPS receivers do today. Those practiced in the art of GPS systems can recognize this type of network as being similar to what are known as GPS pseudolites, but only if it is also imagined that the signals being sent to the mobile nodes are following the GPS signaling protocols. This choice of configuration tries to bridge the backwards compatibility gap between the full implementation of this embodiment and hardware which already exists in abundance: namely, GPS receivers. The fixed nodes in question then could become these GPS-specified transmitters, also containing provisions for broadcasting their fixed known location at street corners, which may result in a city region being bathed in good quality GPS pseudolite signals. An alternative is to not strictly follow either GPS frequency band specifications on the fixed node transmitters but nevertheless follow many of the baseband signaling specifications. Another alternative would be to set up a completely new signaling methodology for the broadcasting nodes. The economics and cost efficiencies of these types of approaches may vary widely, and there should be no inclination to preclude these kinds of sub-configurations from consideration for some given deployment. In this case, the mobile node 145 is still listening to ZTChatter, but that chatter is more structured than might be the case, e.g., with 802.11 based networks.

IX. Minimizing Energy Consumption and Combustion Emissions

The humble magnetic strip sensor in the pavement, multiplied by the innumerable number of such sensors that there are deployed, have already produced untold savings in petrochemical consumption and untold reductions in carbon and pollutant emissions. Estimating exact figures on this may be next to impossible. But utilizing vehicle location approaches either as described in this disclosure or separately derived some other way, or through some blended combination of both, various approaches can be taken to design coordinated traffic control systems with the express and quantifiable goal of substantially reducing consumption and emission further.

Figure 10:
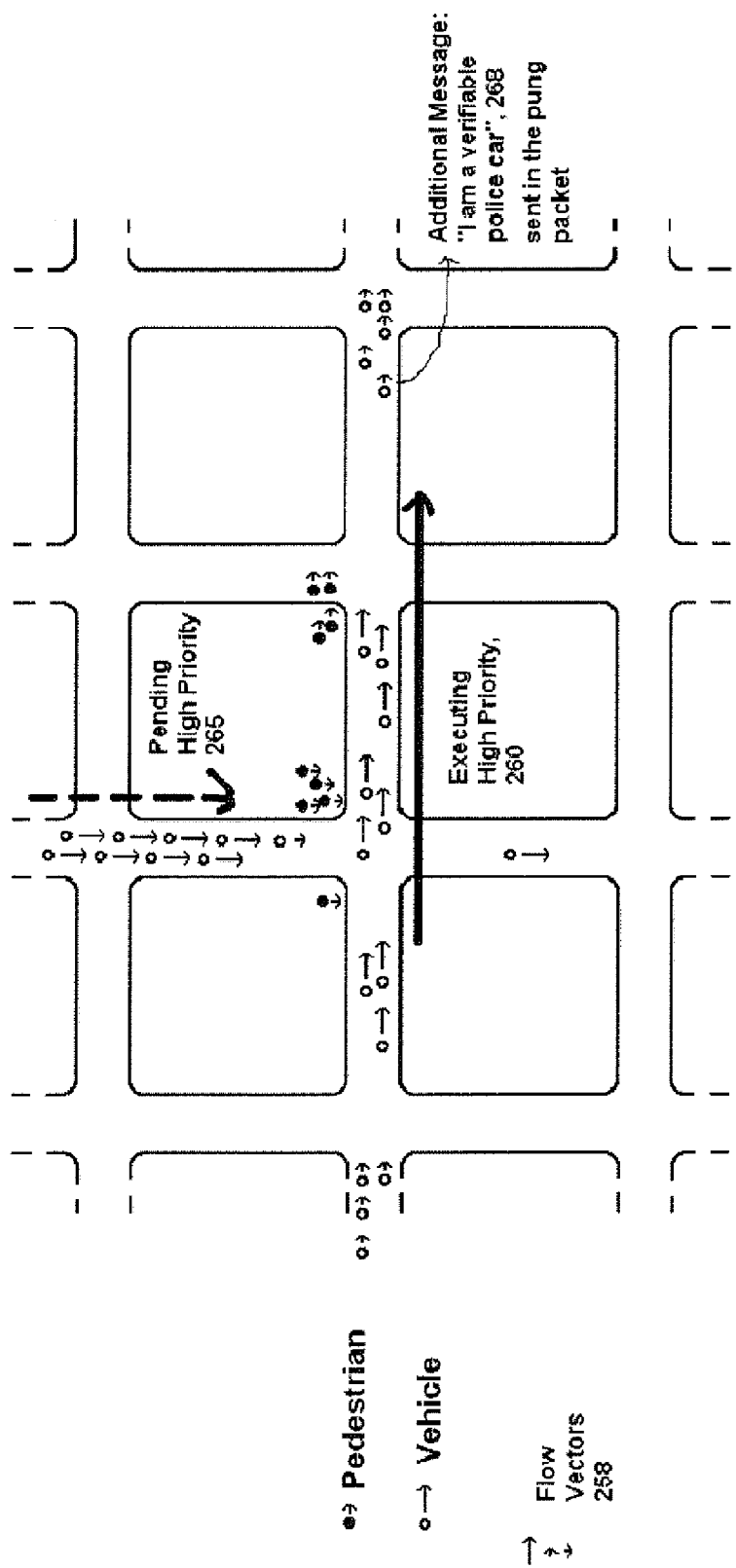
FIG. 10 is a schematic diagram illustrating enhancement of traffic flow management according to certain embodiments.

FIG. 10 is a schematic diagram illustrating enhancement of traffic flow management according to certain embodiments. Flow-Volume and Flow-Vector-Weighting can greatly enhance traffic flow management algorithms which have largely been developed around statistical flow timing and magnetic sensors in the pavement. Anonymous 'opt-in' participation by mobile nodes, incentivized by self-interest, ensures a high enough sampling of actual vehicular and pedestrian flow to produce quantifiable reductions in fuel consumption and emissions for all mobile traffic. Fuel is effectively wasted by idling cars sitting at traffic lights or worse, stuck in gridlock. But, vastly greater amounts of fuel are wasted by interrupting optimal flows of traffic. Needless changes in velocity, for example an inefficient statistical timer on a stop light turning yellow just as ten cars observing the speed limit are approaching from one direction with absolutely no traffic coming from the perpendicular direction, lead to braking and ten to thirty seconds of idling (times ten), but then are followed by acceleration back to the speed limit, with temptations by drivers to go even faster than the speed limit lest they get stopped by the next stop light. One of the reasons that there is a long history of separately stating "highway" miles per gallon (MPG) alongside "city" MPG can almost singly be traced to the underlying statistics of acceleration followed by deceleration and back and forth.

The asymptote of potential improvement in MPG overall may be fixed at some optimal constant speed, say 30 mph. FIG. 10 indicates that the techniques prescribed in this disclosure would address this issue, providing a wealth of new and highly reliable traffic data to the traffic control industry. The fixed nodes sitting on top of traffic lights according to one embodiment was no casual choice, where the AlphaDawg and its back up are becoming more and more connected into networks through the many efforts discussed in the introduction. Their processing power is ever increasing and their sharing of information between grid points is rapidly evolving from the network perspective. This disclosure can provide a wealth of new data to these systems.

FIG. 10 is deliberately simplified in its traffic depiction, where vehicles become generic and pedestrians are illustrated as well. Cell phones, personal digital assistants (PDAs), Bluetooth devices, or even just cheap chirpers as discussed in relation to FIG. 4B, can easily be carried by pedestrian, bikers, etc. Hence, both vehicles and non-vehicles alike are included in FIG. 10.

Part of the overall management of the Zulutime group by an AlphaDawg can then include tracking short histories of members of the local group. As noted, non-vehicle but nevertheless mobile nodes can be included in the definition of local group. These short histories are most simply described by motion vectors attached to known current positions, or they can even include second and third derivatives of motion if ensuing traffic analysis algorithms wish to exploit that higher order motion information. Thus, the AlphaDawg or any designee of the AlphaDawg such as a local server serving, e.g., a 10-by-10 grid of intersections, is effectively generating the raw data level for a real-time mapping of all the participating nodes in the local group. Certain embodiments tend to utilize this multiple block or city sub-grid version of where this mobile object mapping data gets collected, but the AlphaDawg can also do the job.

FIG. 10 shows one very simplified view of what a wider real-time map of mobile objects might look like at some city-grid server (or at an AlphaDawg where neighboring AlphaDawgs have shared their maps of objects not in the other AlphaDawg's local group), leading to intuitive decisions that transportation engineers have been routinely programming into flow-modeled algorithms guiding traffic light changing. FIG. 10 shows that flow is being actively encouraged along the horizontal access, apart from near the far left where vehicles are stopped, and that vehicles along the vertical axis of FIG. 10 are about to pile up at the horizontal intersection. Accordingly, with all due safety procedures nicely attended to, it may be time to change the light!

Transportation engineers may view this description as an oversimplification of the much more complicated considerations required for actual city-traffic-flow algorithms, but this disclosure is intended to provide a very simple example of the power of having local, real-time traffic flow data readily available. The point remains: significant advances in traffic flow management can ride on the back of significantly better raw data on traffic.

Flow vectors 258 are therefore highlighted in FIG. 10 to encapsulate the spatial and motion information known about the various participatory nodes in the network. The thick arrows and text labeled 260 and 265 represent outcomes of hypothetical traffic flow algorithms, which this disclosure does not currently describe in depth, but rather simply references the broad prior art of traffic flow modeling and certain instances of detailed traffic flow management based on flow vectors as being the an approach to building and implementing flow-based decisions. This particular disclosure thus indicates the data pipe and mapping related data sources that feed this large array of prior art algorithms.

Turning now to the large text field in FIG. 10, the phase "opt in" is part of an embodiment, but certainly not required. A clear case in point of a non-opt-in situation may be for emergency response vehicles where there is already a well established industry for communications between such vehicles and traffic lights. Likewise in this disclosure, a highly secure link can be established between any node participant and any other, and if one of the nodes is the AlphaDawg and it is configured to control the light switch, then a secure emergency oriented signal can be sent from the vehicle to the traffic light, with the additional benefit that the traffic light will know exactly where the vehicle is and can monitor its safe passage through the intersection, above and beyond the simple task of turning the light green for the vehicle. Another part of the text in FIG. 10 concerns the self-incentivizing of node participants. This was alluded to above, such as the discussion on the use of tx-only nodes. The broader idea is that a large number of participants may lead to better results, and if individual members of the current traffic trust that they are not being spied upon by the government, large corporations, or other users, and that they are tipping off traffic lights that they desire to move as efficiently as possible through the intersection, then it would make sense that such individuals would be incented to carry network devices and swiftly increase the numbers of participants to meaningful levels. At some critical mass point of the number of participants, sufficient data can begin to be gathered on the amount of fuel savings and emission reductions possible as opposed to existing forms of traffic management.

Note 268 in FIG. 10 depicts but one example of a very large range of possibilities of having local node participants actually pass additional information from the node to the AlphaDawg and/or the traffic management server. Other examples, include communicating information such as "I just put my right blinker on," "I am slowing down to pull over to the curb," or "I just braked very sharply." As shown in note 268 of FIG. 10, communicating that "I am a police car" provides certain implications to the management server such as "do a quick check on any very recent incident reports in this two block area." Certain embodiments use and add to the normal communication networks and thereby use those standard communications to supplement flow-vector data. The related disclosures discuss "pung" packets. It is within these pung packets that the certain embodiment may place these informative extra information. Likewise, the AlphaDawg can also send information to any specific node, a sub-set of nodes, or the entire set of nodes. "Accident immediately ahead" is one example that by its very breadth points to a large range of useful messages that the intersection itself may be broadcasting to ephemeral mobile travelers.

X. Implementation Example of Topographic Oozing

As discussed above, the word "oozing" may be replaced by something more concise and technically descriptive. But, as discussed above, "topographic oozing" is used herein to describe fluid, layered redundant group association dynamics. Likewise, the very word "topographic" also could be either replaced or supplemented with the similar term "topo-logic," in that generic network nodes often use this latter term to describe specific configurations of active node linqs, very often ignoring the "geometric" aspects of those linqs. This disclosure will continue to use the topographic term with the understanding that it includes many aspects of network science topologic principles.

Example implementation of topographic oozing are provided to provide further details on how topographic oozing principles can be applied on current technology RF devices. As DSRC devices may be much harder to come by (at least for the engineering details desired) than 802.11 "WiFi" devices, 802.11 devices are temporarily described for the example implementations, trying in the process to show how DSRC devices can be built to do the same operations. The example switches the baseline usage example from an urban core to the interior of a retail shopping store having similar challenges of mobile devices randomly moving through a large array of fixed nodes. Here to, it is shown how the same basic implementation details can readily apply to urban traffic cores as well as suburban roadways and intersections.

Figure 11:
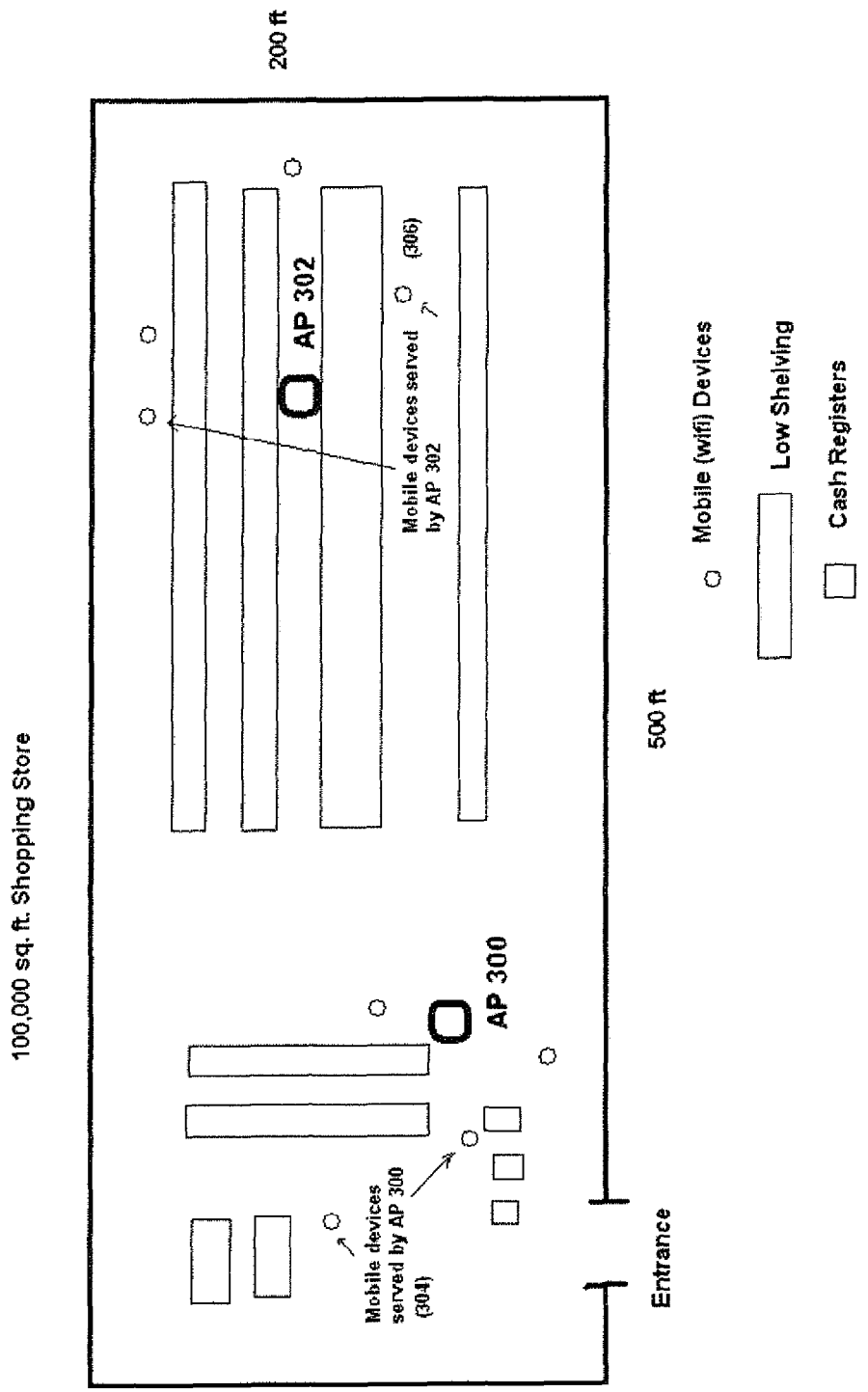
FIG. 11 is a schematic diagram illustrating an example embodiment within a medium sized shopping store.

FIG. 11 is a schematic diagram illustrating an example embodiment within a medium sized shopping store. In this example, the shopping store is about 100,000 square feet, or 500 feet by 200 feet in its two dimensions. The store has two 802.11 access points (APs) labeled 300 and 302 in FIG. 11. The APs 300, 302 presumably service, e.g., store personnel as well as customers in any and all of their WiFi service needs. Many stores of this size would typically have more than two APs. But, for but the simplicity of describing how topographic oozing can be implemented, this disclosure will keep it to just two APs. The AP 300 may generally service users (e.g., the user's WiFi or mobile devices 304) near the front of the store, and the AP 302 may service users (e.g., mobile devices 306) wandering toward the back of the store. This example adds a "complication" that these two APs 300, 302 service their associated devices 304, 306 using different WiFi channels. For example, AP 300 uses channel "3" and AP 302 uses channel "7". This servicing of different devices by different channels is common in WiFi implementations and it is included in this example to show that topographic oozing can also easily function in this multi-channel setting as well.

Figure 12:
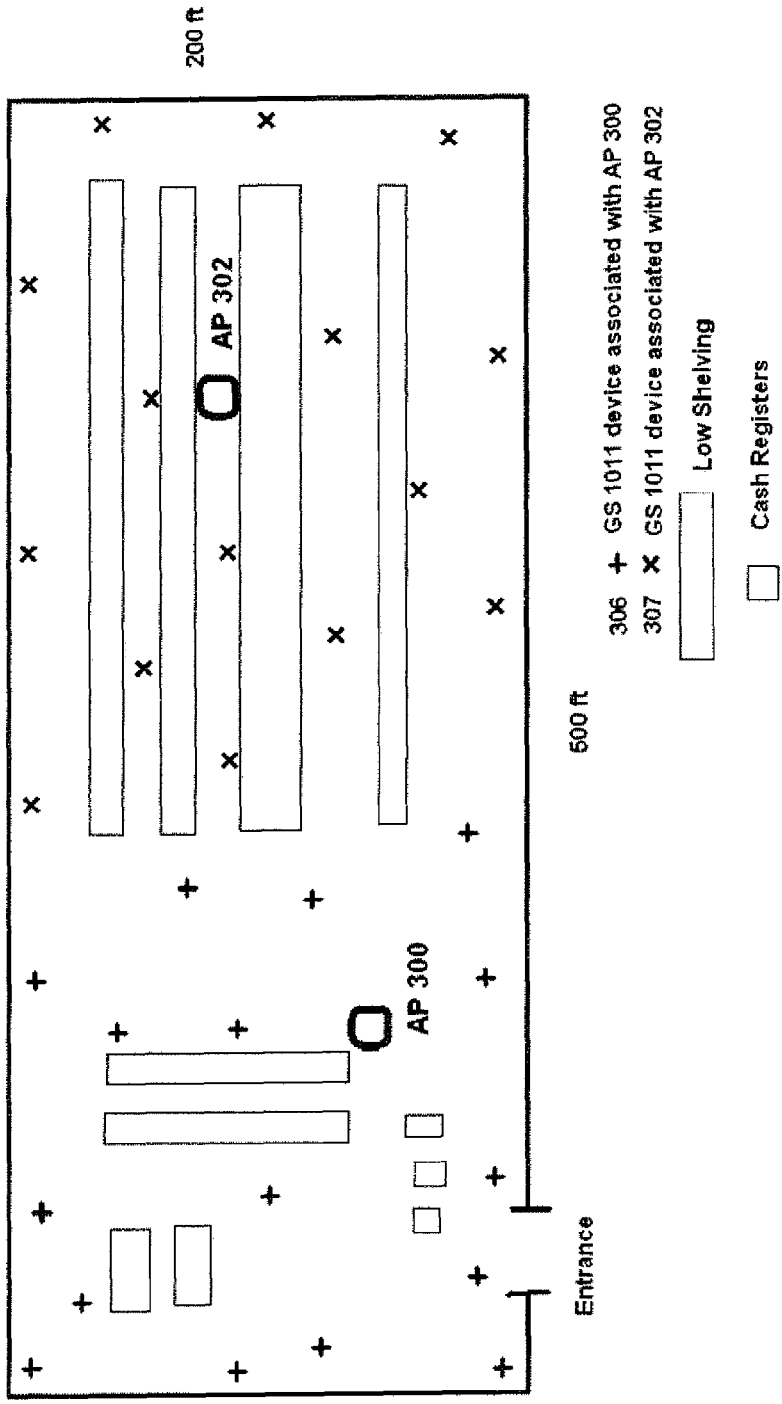
FIG. 12 is a schematic diagram illustrating effectively the same store layout as that shown in FIG. 11, but with a total of 30 additional WiFi devices strewn throughout the store according to one embodiment.

FIG. 12 is a schematic diagram illustrating effectively the same store layout as that shown in FIG. 11, but with a total of 30 additional WiFi devices, collectively labeled 306 (illustrated by "+" symbols) and 307 (illustrated by "x" symbols) (the two separate numbers explained below), strewn throughout the store. In this example, the new 802.11 devices 306, 307 are attached to the ceiling and are powered either by Ethernet drops or by 5 volt power lines. The company Gainspan makes a typical low cost device called the GS 1011, which may be used in certain embodiments. A property of these devices is that they have two processing units, one largely dedicated to WiFi communications and the other being a general purpose ARM processor capable of performing the steps described below.

Each installed GS 1011 is within range of at least one of the APs 300, 302. (Here again, normally there may be more than two APs, but this implementation example uses just two APs for explication purposes; if "range" becomes an issue for a particular application, then the number of APs may be increased, e.g., to three or four or many more for very large stores.)

Before describing how a given mobile device, and eventually many mobile devices, can communicate with the depicted devices of FIG. 12, subsequently having their position solutions continuously tracked (through the topographic ooze), it is instructive to first describe how the 30 GS 1011 devices associate and communicate with the APs 300, 302.

Presumably, an information technology (IT) professional has installed the two APs 300, 302 as is typical for APs servicing a given area intended for many client WiFi devices. This example assumes that these two APs have been so installed and they operate according to very normal AP standards and methods.

Similarly, an IT professional or a trained installation technician may mount the 30 GS 1011's and ensure that they are properly powered and "booted up". They do not necessarily need to be on the ceiling, though this is useful in certain embodiments. Two additional operations take place on each of the GS 1011 devices during this physical mounting and powering step. Once powered, the GS 1011 devices are instructed to act like a normal WiFi client, contacting and communicating with and through one or both APs 300, 302. The other step is that the individual doing the physical installation, or some assistant thereto, logs the actual location of where he/she has installed the given individual device, e.g., relative to a store map. The manner of this logging has many variants, with one method being logging in with a smartphone application indicating the ID number of the GS 1011 device, its IP address, and its store location, usually indicated in aisle numbers and post numbers. Later on, an additional program transfers the logged locations into physical coordinates relative to the 500 by 200 foot dimensions of the physical store, usually including the height of the GS 1011 (above the floor) as well. The accuracy goals of the entire system may require that one should log the locations to slightly better than the position accuracy desired for device tracking, where this is currently roughly a meter or so.

As each GS 1011 device powers up and communicates with an AP, it can perform a variety of provisioning tasks. One task includes contacting some "installation" or set-up IP address in order to fetch further instructions, if any. Or, it may just query a "Zulutime Web Service" and announce it is a new participant. All 30 GS 1011 devices are thus installed, powered up and tested, where any faulty devices (usually none) are immediately flagged and replaced. It is recommended, but not required, that each GS 1011 node chooses one of the other of the APs to be its primary association AP and to choose the channel of that AP as the primary channel that it "listens to" for other WiFi traffic, as will be described further below.

Figure 13:
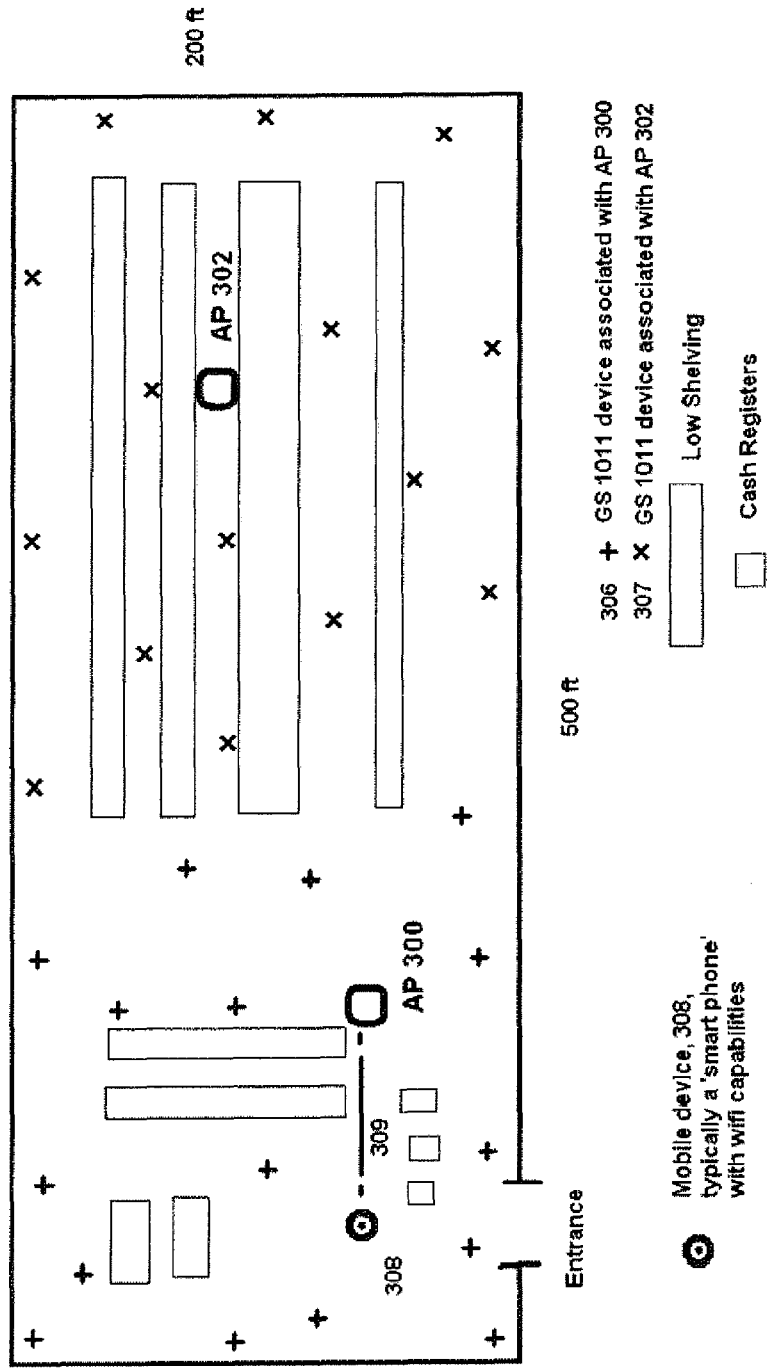
FIG. 13 is a schematic diagram illustrating the shopping store of FIG. 12 with a newly introduced mobile WiFi device somewhere near the entrance of the store according to one embodiment.
Figure 14:
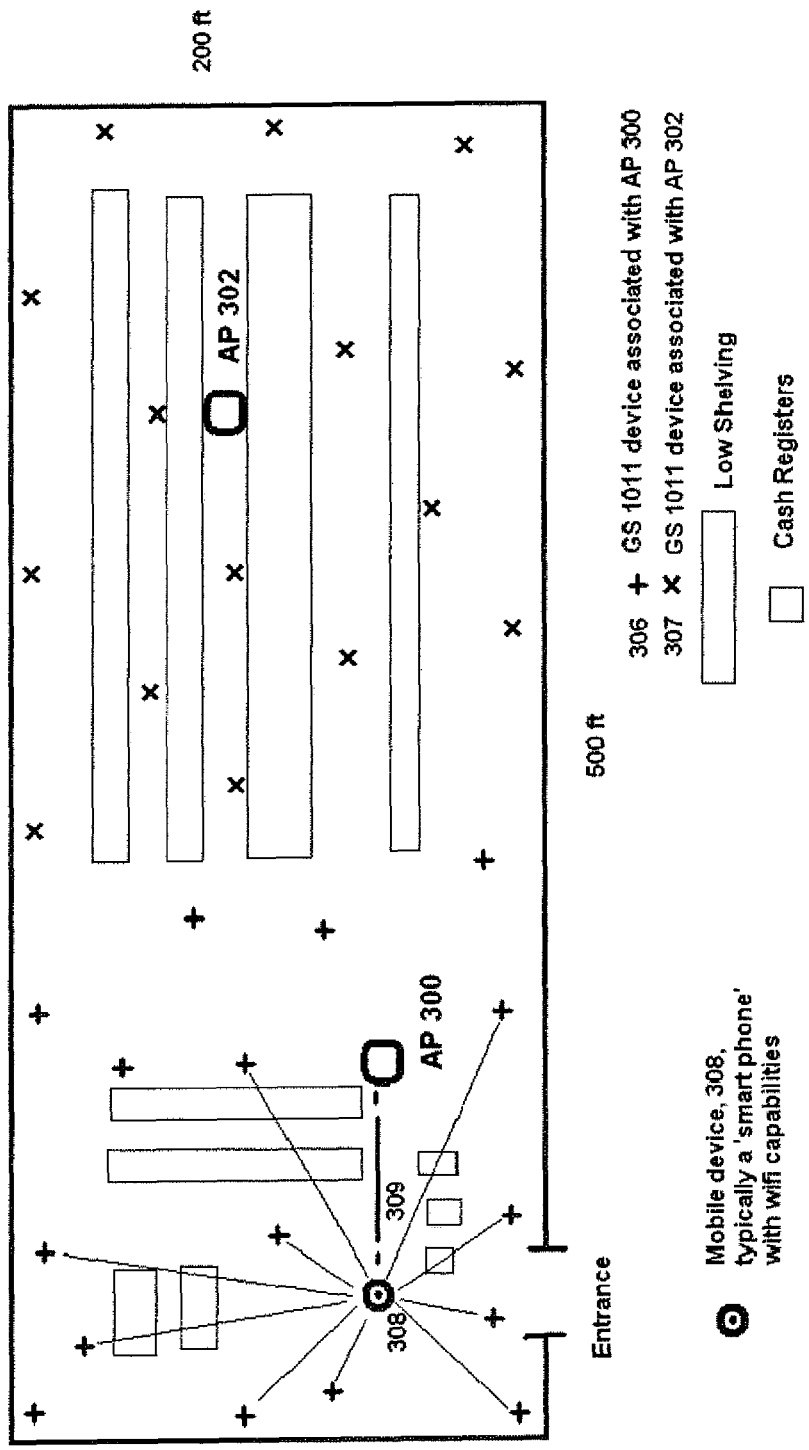
FIG. 14 is a schematic diagram illustrating a packet transmitted from newly introduced mobile WiFi device shown in FIG. 13 according to one embodiment.

A function of the GS 1011 devices is to listen for transmitted WiFi packets from any and all random mobile WiFi devices that establish a WiFi session with the primary AP that it (the GS 1011 device) is associated with. For example, FIG. 13 is a schematic diagram illustrating the shopping store of FIG. 12 with a newly introduced mobile WiFi device 308 somewhere near the entrance of the store. This device 308 establishes its own "normal" duplex packet communication session with the AP 300, represented by the thick line 309 between the device 308 and the AP 300. In doing this normal operation, most if not all of the other GS 1011 devices associated with AP 300 also "hear" or receive the packets coming from the mobile device 308. FIG. 14 is a schematic diagram illustrating a packet transmitted from newly introduced mobile WiFi device 308 shown in FIG. 13 according to one embodiment. FIG. 14 isolates the situation further, showing the hypothetical transmitted packet from mobile device 308 being received by ten GS 1011 devices and also the AP 300. Note that there are more than ten GS 1011 devices associated with AP 300 but not all of them heard the transmitted packet depicted.

Figure 15:
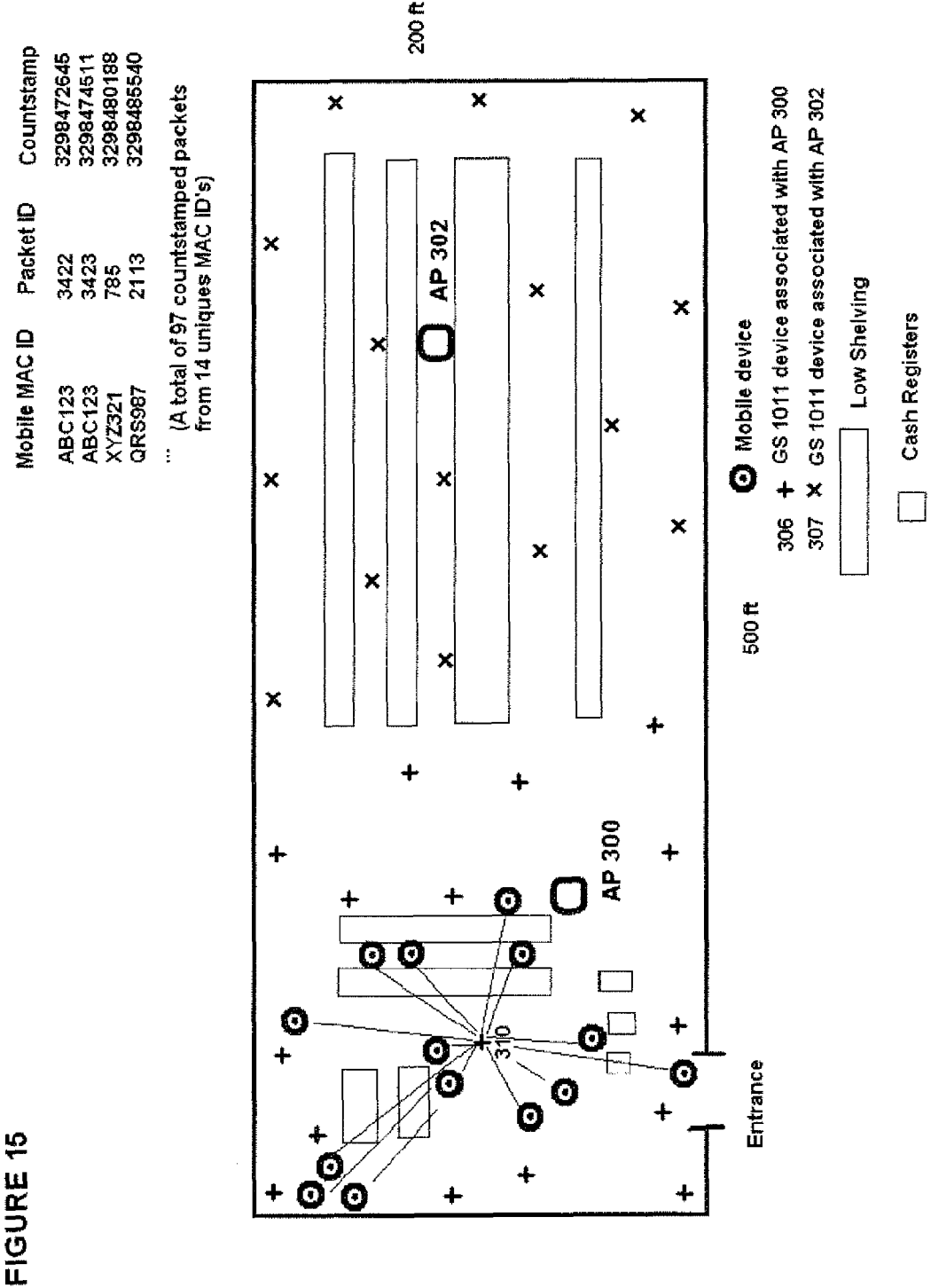
FIG. 15 is a schematic diagram illustrating a more typical but more complicated situation, according to certain embodiments, where there are now dozens of mobile devices in the store all transmitting packets.

FIG. 15 is a schematic diagram illustrating a more typical but more complicated situation, according to certain embodiments, where there are now dozens of mobile devices in the store all transmitting packets every now and then. Some mobile devices are smartphones of customers, others might be I-pads® used by store personnel. Depicted in FIG. 15 is the isolated GS 1011 node labeled 310, where it happens to have received and countstamped a total of 97 packets from 14 different mobile devices over a 2 second period. The mobile devices are 'in session' with the AP 300, but are nevertheless sending out UDP packets that the GS 1011 can also receive and countstamp. (Not depicted in the figure are the same UDP packets being received by the AP 300). FIG. 15 calls out user datagram protocol (UDP) packets in particular, a popular choice for generic WiFi communications, but it need not be only such packets. The node 310 records all of these events as depicted in the associated numeric spreadsheet in FIG. 15 and puts these (or compressed) values directly into a "pung packet" that is transmitted to the IP address given to the node during set-up. If the node is on an Ethernet connection, it will use this channel to ship the pung data. If it is a stand-alone wireless node, it will utilize its association with one of the two APs to gain quick access to the WiFi channel and send the pung data.

The pung packets from the GS 1011 nodes are thus sending their data to some specified IP address (in this example referred to as a Zulutime Web Service), where data processing of the type explained in other sections of this disclosure track clock drifts between the various GS 1011 nodes, remove such drifts from the countstamp data, compute multipath-distorted pseudo-range values, and thereafter calculate optimal positions for the mobile devices using multipath mitigation methods describe in the related disclosures. Even without using multipath mitigation methods, standard techniques exist to compute positions based on, typically, three or more pseudo-ranges. There may be larger relatively larger error bars on the calculated positions in the case where multipath is ignored.

This is the point where this disclosure can more explicitly turn back to the detailed implementation of topographic ooze.

Figure 16:
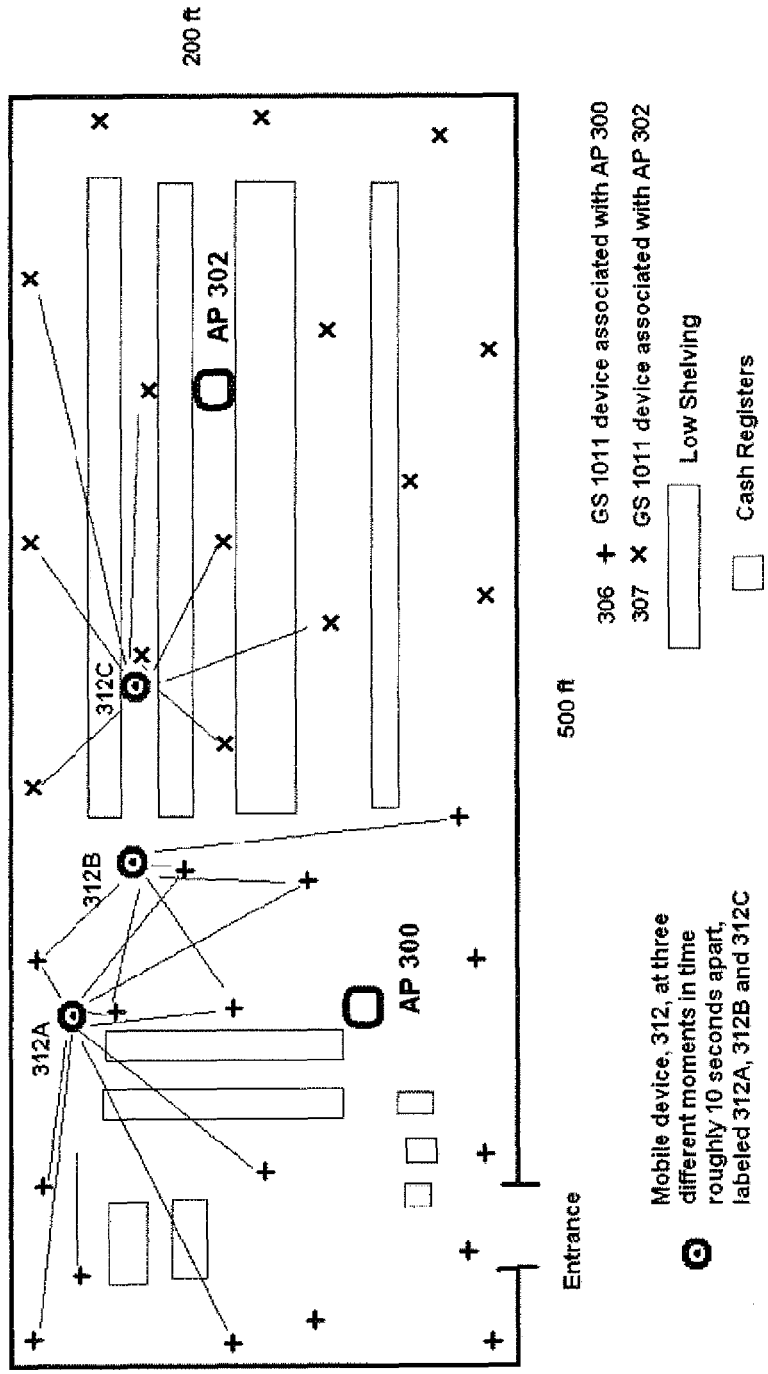
FIG. 16 is a schematic diagram illustrating three instances in time of a single mobile device as it moves among different areas of the store according to one embodiment.

FIG. 16 is a schematic diagram illustrating three instances in time of a single mobile device 312 (shown at different points in time as 312A, 3126, and 312C) as it moves among different areas of the store according to one embodiment. As shown in FIG. 16, the mobile device 312 is labeled 312A at a first location where it is associated with AP 300. The mobile device 312 then moves to an area of the store where it is labeled 312C and where it has re-associated with AP 302; the interim state immediately prior to AP switching is depicted as 3126. The position solutions smoothly track not only as different GS 1011 devices variously receive packets from this mobile device 312, but also how those solutions bridge the gap as the mobile device switches from AP 300 to AP 302. The device 312 at point A (312A) has 10 GS 1011's receiving its packets, moving abruptly down to only 6 at point B (312B), then abruptly going to 8 devices associated with AP 302 by point C (312C). In practice, this 'abruptness' is a bit more fluid but still discrete in nature.

In this example, it is assumed that a person with a mobile smartphone is walking along at about 5 feet per second, then the person takes approximately 20 seconds to walk about 100 feet between location of 312A and the location of 312C. To keep things simple, this example assumes that only the three "linq states" exist during this 20 second period. The first linq state is graphically indicated by 312A where again 10 GS 1011 nodes receive packets from mobile device 312 over six seconds. The second linq state is indicated by 312B where 6 GS 1011 nodes, still associated with AP 300, receive packets over the next seven seconds from mobile device 312. Then, over a very short period, e.g., one quarter of one second, the mobile device 312 re-associates with AP 302 and the third linq state is indicated by 312C where a total of 8 GS 1011 devices (devices that are associated with AP 302), receive and countstamp packets from mobile device 312 over the remaining 6 seconds of our original 20 second stretch.

The details of the topographic ooze take place at the Zulu-time Web Service (ZWS) and the individual GS1011 nodes in the store need not concern themselves with anything other than dutifully transmitting the node and packet IDs of the packets they hear along with the countstamp of when they heard each packet.

The ZWS, on the other hand, is continuously monitoring for exactly how many GS1011 devices are "hearing" any given active mobile node. As discussed above, as well as in the related disclosures, while the number of linqs grows and shrinks on a second by second basis, clock solutions and position solutions can nevertheless be smoothly tracked and determined. Thus, when the linq state moves from 312A to 312B, several of the listening nodes remain the same and these solution techniques may be used in the transition from 312A to 312B. At the juncture where the mobile device 312 re-associates with AP 302, however, a near-split-second switch now occurs between one set of GS 1011 devices on one channel (that of AP 300) and another set on another channel (that of AP 302).

In this instance, the ZWS had been previously aware of the different channels employed by the various GS 1011 nodes during their set-up and registration process. The ZWS is expecting such abrupt changes to occur in terms of which GS 1011 devices are listening to which mobile devices. In this case, the ID (typically MAC address in the WiFi case) of the same mobile device 312 becomes the continuity factor in stitching the previous positional solutions of 312A and 3126 with the newly calculated positional solutions of 312C. In practice, there may be an annoying gap of two or three seconds whereby the solution set of 312C is trying to accumulate sufficient pung data to form a solution, but even here classic Kalman filtering techniques familiar to GPS receiver designers can help bridge the smoothness-and-accuracy-of-solution gap.

Figure 17:
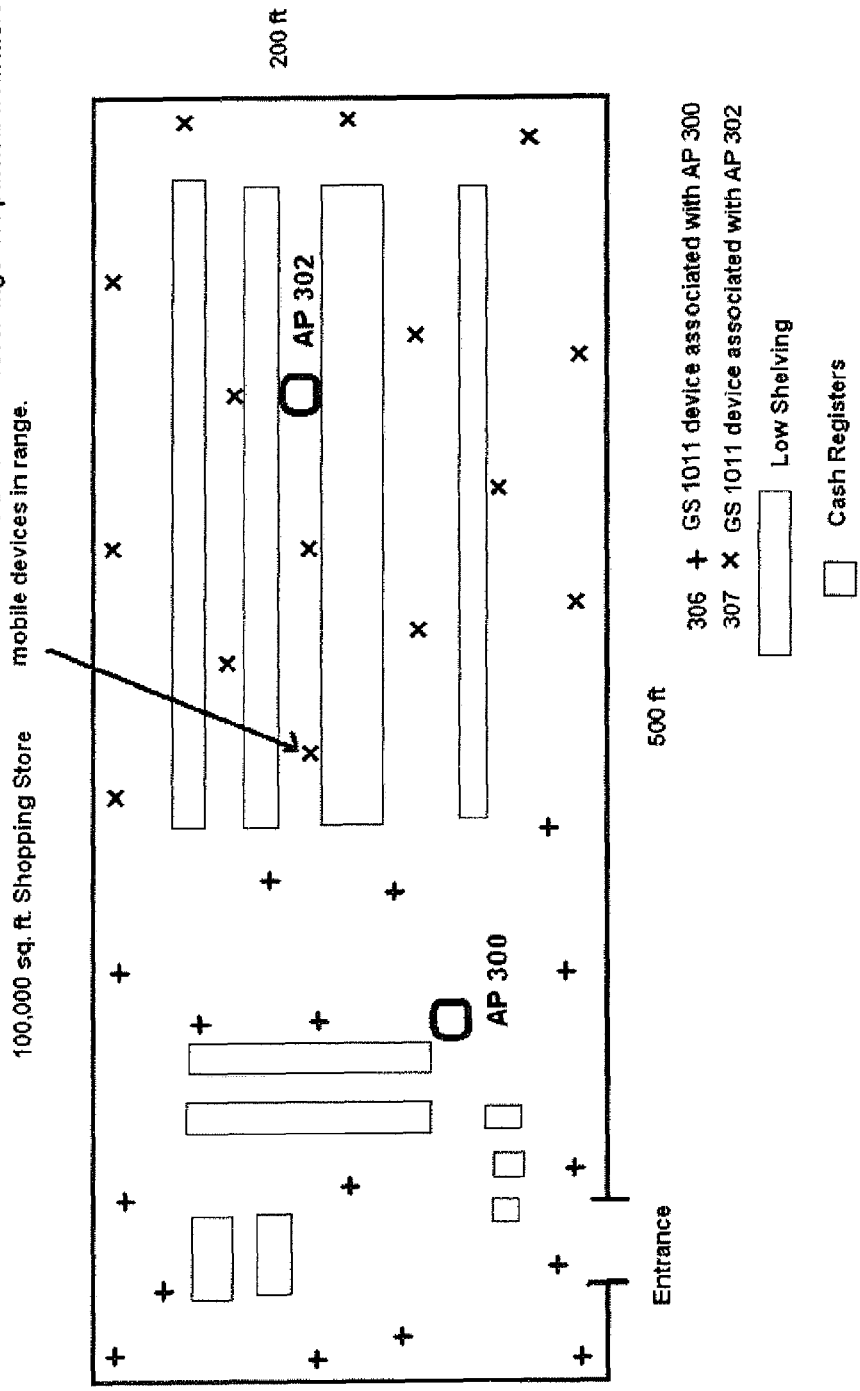
FIG. 17 is a schematic diagram illustrating an advanced variant, according to one embodiment, on the baseline description for the examples shown in FIGS. 11, 12, 13, 14, 15, and 16.

FIG. 17 is a schematic diagram illustrating an advanced variant, according to one embodiment, on the baseline description for the examples shown in FIGS. 11, 12, 13, 14, 15, and 16. FIG. 17 depicts the routine "channel hopping" that GS 1011 devices can perform, especially those devices lying in the middle zone between AP 300 and AP 302. GS 1011 devices such as this one can certainly 'channel switch' in a receive-only mode and on a routine bases between the channel of AP 300 and the channel of AP 302. Given that mobile devices are generally fairly 'slow', it doesn't matter too much to the continuity of solutions and only adds accuracy because more GS 1011 devices are receiving more packets from more mobile devices in range. The idea is rather simple: Hop back and forth in "receive only" mode between the channel of AP 300 and the channel of AP 302, and still accumulate the IDs and countstamps of all the packets you hear. The nodes package the data up into pung packets just as before, and are free to use whatever is the most convenient channel to transmit their pung packets to a selected IP address. Since mobile devices are generally relatively slow in terms of moving through "zones of coverage," the continuity of positional solutions usually is greatly enhanced by this channel switching rather than harmed.

Another advanced variant on the descriptions of FIGS. 11, 12, 13, 14, 15, 16, and 17 is where the GS 1011 devices "go out of their way" to not only countstamp their own outgoing WiFi packets (countstamped tx events), but to send out such packets on a regular basis, e.g., two to three short packets every three to five seconds. In this approach, the GS 1011 packets are themselves putting out "calibrated WiFi traffic" (through their own countstamping of the outgoing packets) such that other GS 1011 devices can also receive these types of packets. The related disclosures go to lengths to describe the additional benefits of countstamping outgoing packets as well as only incoming packets (from the mobile devices). The additional transmit-countstamp values are of course loaded up into standard pung packets for transmission back to a chosen IP address, often the ZWS.

XI. Example Geofencing Implementation

The term "goefencing" has become rather popular, and refers mainly to the use of GPS receivers whereby when a person "enters some virtual location zone" then some action takes place. The output of the GPS receiver (a device's location), is the triggering mechanism to determine whether one is inside or outside the fence. Such geofencing approaches are applicable to position solutions formed by the descriptions in this disclosure and in the related disclosures. Additional benefits (over GPS) of using this disclosure's approach whereby WiFi or some other communicating channel is being employed, is that the very channel being used can also service geofencing applications, responses, identification, and association functions.

It will be understood to those having skill in the art that many changes may be made to the details of the above-described embodiments without departing from the underlying principles of the invention. The scope of the present invention should, therefore, be determined only by the following claims.

The invention claimed is:

1. A method of determining ranges between a plurality of communication devices, the plurality of communication devices including at least one mobile communication device, the method comprising:

receiving, at a first communication device, receive messages transmitted from a plurality of other communication devices, each receive message including a transmit count stamp corresponding to a remote counter value at transmission of the receive message from a corresponding other communication device, wherein the first communication device generates a receive count stamp for each receive message corresponding to a local counter value at receipt of the receive message from one of the other communication devices and for messages received from the mobile communication device;

as the mobile communication device travels along a path relative to the plurality of other communication devices, dynamically associating and disassociating the mobile communication device with a plurality of sub-groups of the plurality of other communication devices; and for each sub-group currently associated with the mobile communication device, generating range estimates between the mobile communication device and the other communication devices in the sub-group currently associated with the mobile communication device, the range estimates based on a combination of the transmit count stamps and the receive count stamps; and wherein at least one of the range estimates is a mobile device range estimate between the mobile device and a second communication device that the mobile communication device is newly associated with in one of the sub-groups, and the mobile device range estimate is computed as a function of a local clock time of the second communication device, and a delta time relating the local clock time to a time for a group of communication devices computed based on count stamps previously communicated between the second communication device and other communication devices in the plurality of sub-groups.

2. The method of claim 1, wherein each sub-group includes at least one non-mobile communication device.

3. The method of claim 2, wherein the at least one non-mobile communication device is located in a traffic light at a street intersection.

4. The method of claim 2, wherein the range estimates are used to control the traffic light.

5. The method of claim 1, further comprising:

transmitting, from the mobile communication device, transmit messages, each transmit message including a transmit count stamp corresponding to a local counter value at the transmission of the transmit message.

6. The method of claim 1 comprising:

propagating relationships among local clocks in the communication devices in the plurality of the sub-groups, including:

for each of the sub-groups, gathering count stamps for messages transmitted between nodes in the sub-group over a period of time;

from the count stamps gathered for a first sub-group, determining differential clock solutions for corresponding clocks in nodes of the first sub-group, where the differential clock solutions provide a relative timing solution between nodes of the first sub-group;

from the count stamps gathered for a second sub-group, determining differential clock solutions for corresponding clocks in nodes of the second sub-group; and diffusing a differential timing solution between nodes belonging only to the first sub-group and nodes belonging only to the second, through clock solutions for nodes shared between the first and second sub-groups.

7. The method of claim 6 wherein a local time of at least one of the sub-groups is directly referenced to a standard time reference, and the standard time reference is used to compute timing solutions for other nodes by relating differential solutions for the other nodes to the standard time reference.

8. The method of claim 6 wherein existence and differential time solutions of shared nodes belonging to both of the first and second sub-groups are used to combine the two separate groups into a singular larger group of differential timing solutions.

9. The method of claim 6 further including determining a timing solution for a node as a weighted combination of differential timing solutions for nodes connected through message hops to a reference node.

10. The method of claim 9 wherein the reference node is directly referenced to a standard time reference.

11. The method of claim 6 wherein each of the sub-groups includes a managing node corresponding to the sub-group, the managing node maintaining a list of active nodes participating in communicating count stamped messages in the corresponding sub-group.

12. The method of claim 6 wherein each of the sub-groups include nodes with corresponding ping drivers, the ping drivers count stamping messages upon transmission or receipt of the messages with a counter value from a local, independent counter within a corresponding node.

13. The method of claim 6 wherein at least one of the nodes in the sub-groups is the mobile communication device, which temporarily becomes a member of a sub-group as the mobile communication device moves relative to communication devices in the sub-groups.

14. The method of claim 6 wherein determining differential clock solutions comprises formulating a system of equations relating local clock counts of the nodes and associated error terms based on messages communicated between pairs of nodes in a sub-group over a time interval.

15. A method of positioning of a mobile device, the method comprising:
as the mobile device moves relative to first and second sub-groups of nodes, tracking associations between the mobile device and nodes in the first and second sub-groups;
for each of the sub-groups, gathering count stamps for messages transmitted between nodes in the sub-group over a period of time;
from the count stamps gathered for the first sub-group, determining differential clock solutions for corresponding clocks in nodes of the first sub-group;
from the count stamps gathered for the second sub-group, determining differential clock solutions for corresponding clocks in nodes of the second sub-group;
wherein a differential clock solution for a local clock in a first node provides a relative timing between the local clock in the first node and timing computed for a group of nodes based on count stamps communicated between nodes in the group; and
based on local clock times and differential clock solutions for nodes in the first and second sub-groups, determining range estimates between the mobile device and nodes in the first and second sub-groups from which the position of the mobile device is determined.

16. The method of claim 15 wherein a local time of at least one of the sub-groups is directly referenced to a standard time reference, and the standard time reference is used to compute timing solutions for other nodes by relating differential solutions for the other nodes to the standard time reference.

17. The method of claim 15 wherein differential time solutions of shared nodes belonging to both of the first and second sub-groups are used to combine the two separate groups into a singular larger group of differential timing solutions.

18. The method of claim 15 further including determining a timing solution for a node as a weighted combination of differential timing solutions for nodes connected through message hops to a reference node.

19. The method of claim 15 wherein each of the sub-groups includes an alpha node corresponding to the sub-group, the alpha node maintaining a list of active nodes participating in communicating count stamped messages in a corresponding sub-group.

20. The method of claim 15 wherein determining differential clock solutions comprises formulating a system of equations relating local clock counts of the nodes and associated error terms based on messages communicated between pairs of nodes in sub-group over a time interval.

* * * * *